(12) United States Patent
Hare

(10) Patent No.: US 11,452,297 B2
(45) Date of Patent: Sep. 27, 2022

(54) ROBOT GRIPPER

(71) Applicant: Tracy Brian Hare, Lagrange, GA (US)

(72) Inventor: Tracy Brian Hare, Lagrange, GA (US)

( * ) Notice: Subject to any disclaimer, the term of this patent is extended or adjusted under 35 U.S.C. 154(b) by 0 days.

(21) Appl. No.: 16/911,508

(22) Filed: Jun. 25, 2020

(65) Prior Publication Data
US 2021/0400993 A1    Dec. 30, 2021

(51) Int. Cl.
*A22C 17/00* (2006.01)
*B65B 5/10* (2006.01)
*B65G 47/90* (2006.01)

(52) U.S. Cl.
CPC .......... *A22C 17/0093* (2013.01); *B65B 5/105* (2013.01); *B65G 47/90* (2013.01)

(58) Field of Classification Search
CPC .......... B25J 11/0045; B25J 15/0014; B25J 15/0052; B25J 15/0028; B25J 15/022; B25J 15/0226; B25J 15/028; B25J 9/0093; B65B 5/105; B65G 47/90; B65G 47/907; B65G 47/918
See application file for complete search history.

(56) References Cited

U.S. PATENT DOCUMENTS

| | | | | |
|---|---|---|---|---|
| 4,048,784 A * | 9/1977 | Toby | ..................... | B26D 7/32 53/77 |
| 5,105,606 A * | 4/1992 | Creed | ..................... | B65B 5/105 53/251 |
| 5,551,550 A * | 9/1996 | Marshall | ................ | B65G 47/82 198/419.3 |
| 6,079,896 A * | 6/2000 | Dellach | .................. | B25B 5/087 269/32 |
| 7,845,698 B2 * | 12/2010 | Jenkins | ................ | B25J 19/0091 294/202 |
| 7,887,108 B1 * | 2/2011 | Cawley | ................ | B25J 15/0266 294/2 |
| 8,322,537 B2 * | 12/2012 | Lindee | ................. | B65G 47/244 209/592 |
| 2008/0035038 A1 * | 2/2008 | Ekholm | ................. | D05B 19/16 112/2 |
| 2019/0071195 A1 * | 3/2019 | Hyodo | .................... | B65B 43/26 |

* cited by examiner

*Primary Examiner* — Gregory W Adams
(74) *Attorney, Agent, or Firm* — Weiss & Weiss Attorneys; Philip Weiss

(57) ABSTRACT

A robot gripper that takes stacked patties from a conveyor and moves then to a packaging device.

9 Claims, 28 Drawing Sheets

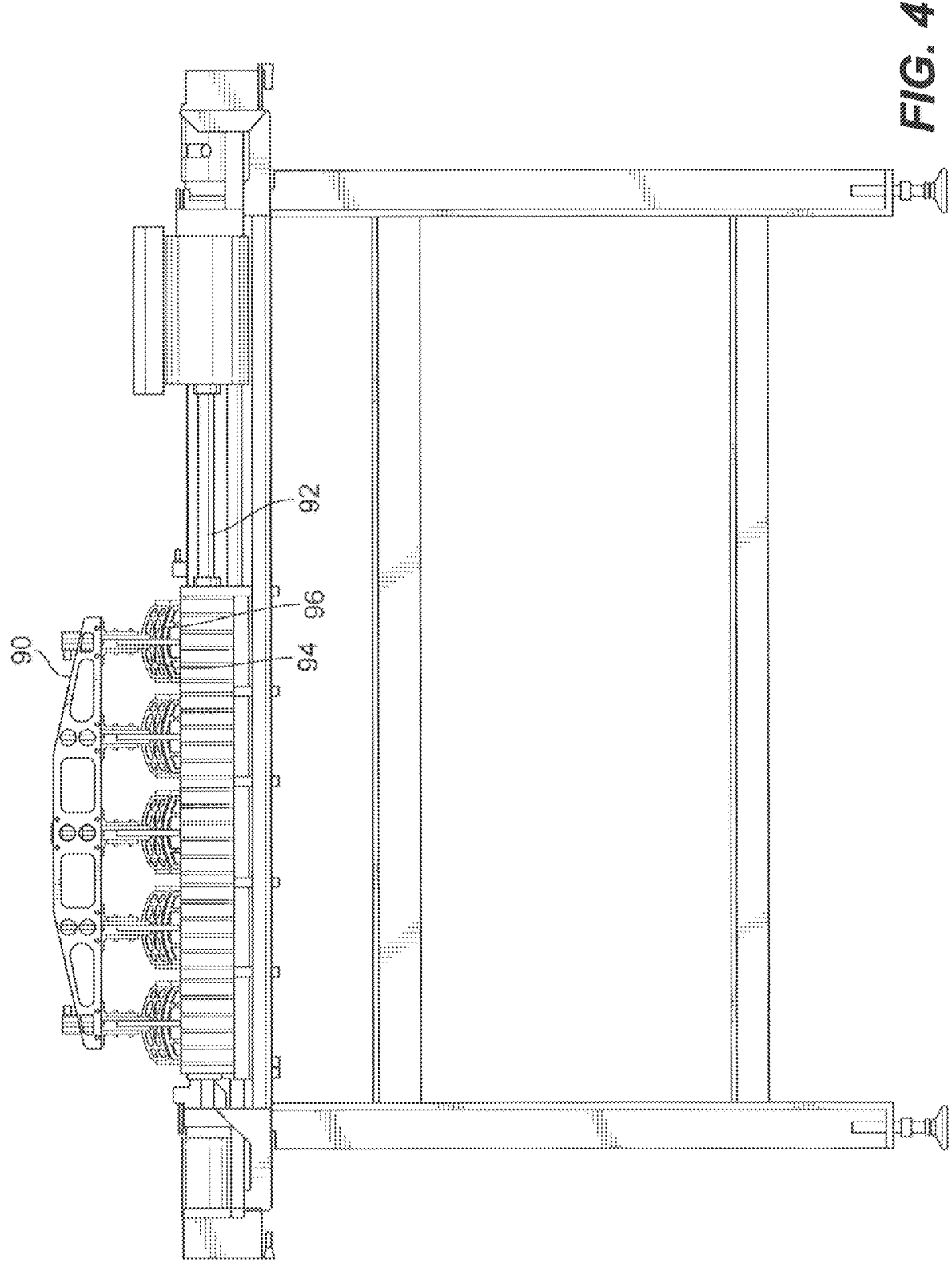

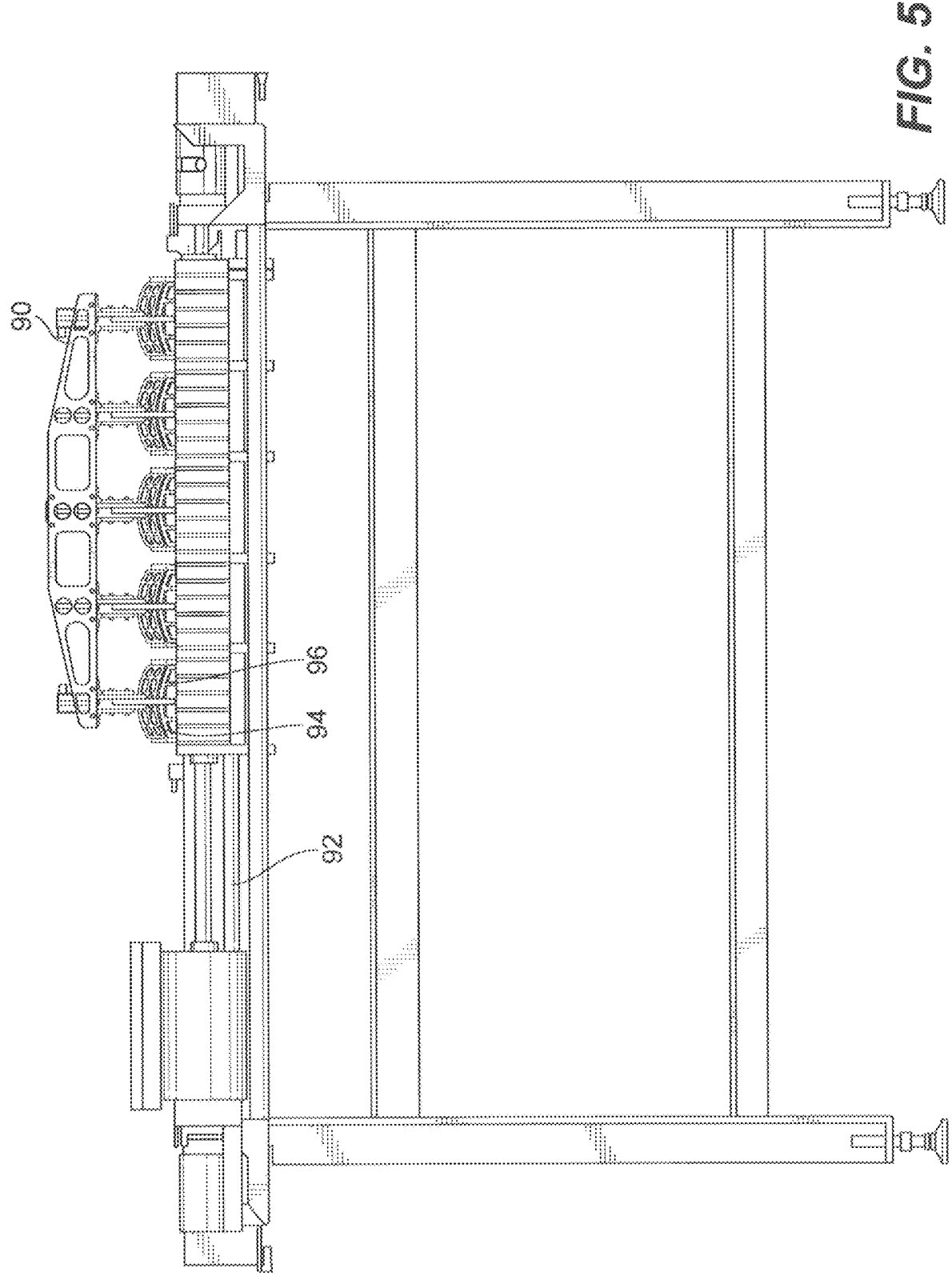

ROBOT GRIPPER

FIELD OF THE INVENTION

The present invention relates to a robot gripper that takes stacked patties from a conveyor and moves then to a packaging device.

BACKGROUND OF THE INVENTION

U.S. Pat. No. 5,040,056 relates to an apparatus for picking up and manipulating randomly oriented and randomly positioned objects moving on a belt. An image processing unit using a vision system identifies and locates objects in successive overlapping vision windows up to a predetermined optimum number of objects. Locations of those objects is entered in an output queue transmitted to the object location queue of a first robot motion controller. First robot picks up and deposits all objects it can in time available while objects pass and enters locations of objects not picked up in output queue transmitted to object location queue of second robot motion controller.

U.S. Pat. No. 6,374,984 relates to a method for automated grouping of objects randomly placed onto a conveyor belt and transported in a steady conveying flow to a grouping device. A recognition device determines location and position of objects transported on conveyor belt before reaching grouping device and communicates location and position of objects to a control unit. The control unit evaluates the random ordered state of the objects on the conveyor belt based on the location and the position of the objects. A control unit determines, based on the evaluation result of the evaluating step, sorting positions on the conveyor belt. A handling device groups, taking into account belt speed, objects in a group on each one of the determined sorting positions on the conveyor belt. Groups of objects are further transported on the conveyor belt.

U.S. Pat. No. 5,810,149 relates to a conveyor system accepting one or more streams of product and converting the streams to a format for automatic loading to a subsequent machine. Conveyor system comprises an input level shifting conveyor to receive product input streams. Level shifting conveyor is movable between upper level and lower level position. Upper level strip conveyor receives product from input level shifting conveyor. Upper level strip conveyor includes an output end in a fixed position to direct product by the upper level strip conveyor to a first lateral alignment position of the format. Lower level strip conveyor receive product from level shifting conveyor moved to a lower level position. The lower level strip conveyor includes an output end in a fixed position to direct product received by the lower level strip conveyor to a second lateral alignment position of format. The second lateral alignment position is different from the first lateral alignment position. The output level shifting conveyor is movable between an upper level position to receive a product from the upper level strip conveyor and lower level to receive product from lower level strip conveyor.

U.S. Pat. No. 6,688,452 relates to a multi-head robotic system for delivering numerous robotic devices to a task site. A number of robotic devices perform tasks simultaneously. The sequence in which the robotic devices arrive at or leave a task site is unlimited. Robotic delivery system can leapfrog robotic devices, or placing them randomly at locations where they are needed.

US patent publication 20060182603 relates to tooling for securing to the movable end of a computer-controlled robotic arm, where an article can be picked up, rotated and lowered into a new position. Tooling comprises two blades, movable between first open position and second closed position. Tooling can be lowered with blades separated until blades make contact with surface of article, and then blades move inwardly below article so tooling raises article. Support member may be positioned above each of the blades and a drive means moves both support members and blades until the article is gripped between support members. A viewing system provides image signals to a robotic arm controlling computer to determine orientation of each article to be picked up and generate control signals for rotating the tool.

U.S. Pat. No. 4,922,435 relates to a fully automated robotized system and method for cooking food products. The system includes a robot, bulk uncooked food dispensing station and a cooked food storage station. The system can be controlled by a computer operating and control station that controls the robot to obtain bulk food from dispensing station, placing it in cooking position at cooking station, and when cooked, remove food and deliver to storage station.

U.S. Pat. No. 5,172,328 relates to a fully automated robotized system and method for cooking food products. The system includes a robot, bulk uncooked food dispensing station and a cooked food storage station. System can be controlled by a computer operating and control station that controls the robot to obtain bulk food from dispensing station, placing it in cooking position at cooking station, and when cooked, remove food and deliver to storage station. In one embodiment, the cooking station is a clamshell grill and the robot deposits on and retrieves from the grill hamburger patties in a predetermined horizontal array with a novel end of arm tool.

U.S. Pat. No. 5,403,056 relates to a robotic hand on a robot for picking up several flattened articles in a stack form in a non-damaging manner. The robotic hand has a manifold for directing controlled pressure air and a set of gripper finger assemblies. Each finger assembly has a rigid finger support member and an inflatable bladder extending along its length. Bladders are in communication with chamber of manifold and external source of positive and negative pressure air. Robotic hand can position itself over an article to be picked up with gripper fingers. Pressurized air is directed through the manifold into bladders of fingers. Bladders expand to grasp sides of articles. Robotic hand is moved to a position over the article where bladders of fingers are deflated to the cause first article to drop onto the second article. Reinflating bladders causes gripper fingers to grasp the two articles. Steps are repeated until a stack of predetermined number of articles formed. Robotic hand deposits a stack into an open top container to fill the container.

U.S. Pat. No. 8,627,941 relates to a food handling system having a positioning system and method. Positioning system includes a main conveying surface, an electronic sensor, a controller and robot. The main conveying surface moves the food. Electronic sensor captures position data of food products on conveying surface within sensor range of sensor. Controller is signal-connected to an electronic sensor and robot. Controller receives data captured by the sensor and instructs the robot to move food product to a destination position. Robot repositions food products on conveying surface according to instructions sent by the controller. Robot has longitudinal and lateral working range. Food product includes meat patties, or sliced meat or cheese.

U.S. Pat. No. 8,931,240 relates to a shuttle system including a main conveyor for transporting food products in a longitudinal direction and moving in the longitudinal direction to a filling station. The shuttle system includes a shuttle robot for moving food product from the main conveyor to the open top container in a filling station. A sensor receives food product position data and a controller receives data from a sensor and instructs operation of a robot. Shuttle system requires an off-weight conveyor.

US patent publication 20080131253 relates to an apparatus that includes a robotic arm, an end of arm tool attachment for engaging an article and a position and location determination device. The article may be initially provided on a conveyor. The conveyor may have two or more tracks that form one or more grooves for allowing figures on the end of arm tool to pass between and below adjacent tracks so fingers can engage the bottom or side of the article. Article may be any rigid or non-rigid body or product.

The prior art teaches a clamshell gripper. Clamshell grippers rotate about two points defining an elliptical arc. The clamshell design causes the gripper fingers to interfere with the product during actuation. The interference causes inconsistent locating of the product during picking and placing because of variation in geometry of the product and variation in physical contact. The inconsistent interference lends itself to high inconsistencies in patty placement location and orientation and is not cost effective.

SUMMARY OF THE INVENTION

The present invention relates to a device for gripping patties from a conveyor and moving them to packaging for the patties. It is an object of the present invention for the patties to be protein patties. It is an object of the present invention for the patties to be meat patties.

In order to insure patty placement is accurate and repeatable, the gripper must disengage from the patty immediately upon actuation of the placement operation and not engage the patty until the gripper is closed during the picking or grasping operation.

If the gripper fingers drag on the raw patty during actuation, the patty will not be controlled during the picking or placing operation. This will cause the shipping packages to be non-uniform between containers and possibly cause the final sealing of the package to be non-hygienic.

In order to solve the issue of the gripper fingers dragging, the gripper motion is guided with pins sliding in a hybrid combination of curved and straight slots. These features force the clamshell finger motion during the opening and closing of the gripper to move down during the actuation thus minimizing the movement of the free patty when grasped or released.

It is an object of the present invention for the gripping fingers to move away from the patty faster than the gravity force acting upon the patty stack thus minimizing the changes in altitude of the patty during flight after being dropped.

It is an object of the present invention to allow the gripper fingers to reach under the conveyor surface, the conveyor surface being divided into sections with gaps between them providing clearance for the fingers to protrude below the bottom of the patty.

It is an object of the present invention for the gripper to have 5 patty end of arm tooling which is capable of moving 400 patties every five minutes. It is an object of the present invention for the system to comprise two patty end of arm tooling that is capable of moving 275-300 patties every five minutes.

It Is an object of the present invention for the gripper to be designed with no metal to metal contact for moving parts.

It is an object of the present invention to use food grade lubricants only for the gripper design.

It is an object of the present invention for the gripper design to allow for the picking up and placing of individual raw formed product and stacks of raw formed product. The complete system of multiple grippers is defined as an end of arm tool. The end of arm tool can be used to pick and place individual product in an array of single patties or arrays of stacks of patties or product.

It is an object of the present invention for each individual gripper in the end of arm tool to be independently actuated allowing the product to be picked or placed from and to multiple locations, not as a group, but used in unison. This independence allows the placement of single or multiple product into multiple locations or packaging.

It is an object of the present invention for the guide plate to be made of food grade plastic. It is an object of the present invention for the actuator bearings to be made of food grade plastic.

The present invention relates to a device for moving food patties comprising: a gripper, the gripper comprised of fingers that are placed under a patty that create no interference. The gripper further comprises a single actuation, two angle adapters and two motion spacers. Guided pins and hybrid slots allow the gripper to move in straight and complex curves. A cage keeps patties from moving while gripped.

The present invention relates to a method of moving patties comprising: placing an individual gripper in an open position, and surrounding a stack of patties on a conveyor. The gripper moves along the conveyor belt and is placed around patties in a closed position. The patty is surrounded with a cage and fingers underneath the patty. The patties are placed in a tray device for packaging.

The present invention relates to a gripper device comprising: two finger assemblies, each finger assembly comprising a cage, patty grip fingers, and a patty grip arm. The gripper device further comprises two motion spacers, two angle adapters, and a part that changes motion from up and down to opening and closing of the gripper.

It is an object of the present invention for the part to comprise a coupling bearing attached to an actuator pin and pneumatic rod connect that connects a connector actuator to the coupling bearing.

It is an object of the present invention for the gripper device to further comprise air fittings. It is an object of the present invention for the gripper device to further comprise a pneumatic actuator and pneumatic actuator adapter.

The present invention relates to a robotic gripper conveyor tray device comprising: a conveyor, trays, grippers, and arms having grippers within the arms. The arms have grippers located above the conveyor and in an open position. The conveyor has raw patties on it. The gripper grips the patties from the conveyor and moves the patties onto the trays. The trays are located on a tray moving device.

It is an object of the present invention for the arms to pick up five stacks of food from the conveyor.

It is an object of the present invention for the arm to have twelve grippers.

It is an object of the present invention for the stacks of patties to be placed one or two per drop until all of the grippers are empty before returning to the conveyor.

It is an object of the present invention for the trays to be of any size and shape as long as they have two locatable edges for guidance. It is an object of the present invention for the arm with the grippers to drop individual stacks in prescribed packaging tray locations. It is an object of the present invention for the arms containing the grippers to independently drop stacks of patties in multiple locations while the trays are moving. It is an object of the present invention for the device to further comprise a programmed control system that tracks position of the tray on the tray moving device.

It is an object of the present invention that after the final stack of patties is dropped into the tray, the robotic gripper robot returns to the conveyor and picks another array of stacks.

It is an object of the present invention for a first and second robotic gripper work in tandem with a dependent algorithm allowing spaces in the trays to be filled by the second robotic gripper after the first robotic gripper is finished.

It is an object of the present invention for the device to comprise removable upper and lower end guards and removable transition cover.

The present invention relates to a gripper device comprising: an adapter, motion spacer, motion plate; two stack finger weldment, pin actuator and pin hold. The gripper device having no metal to metal contact for moving parts. Each gripper is part of an end of arm tool that is independently actuated allowing product to be picked or placed from and to multiple locations, not as a group. It is an object of the present invention for the grippers to be used in unison. It is an object of the present invention for the gripper device to allow placement of single or multiple product into multiple locations or packaging.

BRIEF DESCRIPTION OF THE DRAWINGS

FIG. 4 shows a side view of the five stack gripper device of the present invention.

FIG. 5 shows a side view of the five stack gripper device of the present invention.

DETAILED DESCRIPTION OF THE INVENTION

Figure 1A:
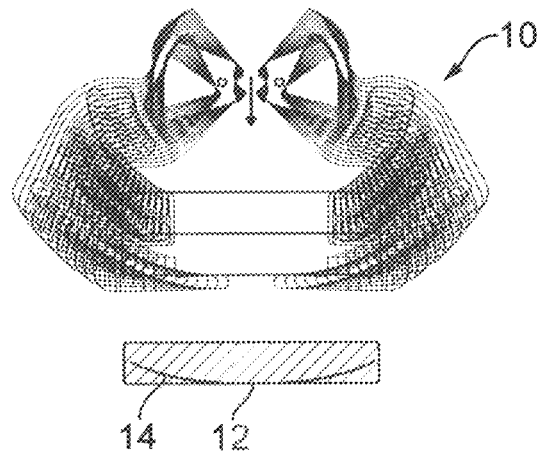
FIG. 1a shows a front view of a prior art clamshell gripper with a formed raw patty.
Figure 1B:
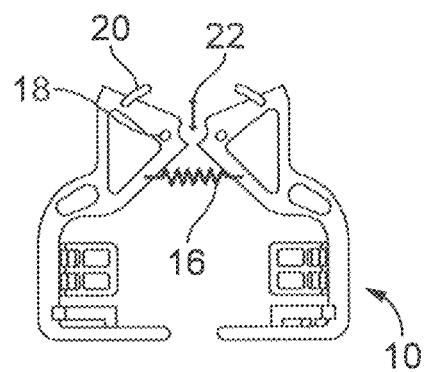
FIG. 1b shows a front view of a prior art clamshell gripper.

FIG. 1a shows a prior art conventional clamshell gripper 10, for gripping a formed raw patty 12. Using the gripper 10 creates a gripper interference path 14 that creates a continuous massive interference. FIG. 1b shows the prior art gripper 10 having a tension spring 16, fix slot pin guided 18, pin guided motion 20 and single actuation 22.

Figure 2A:
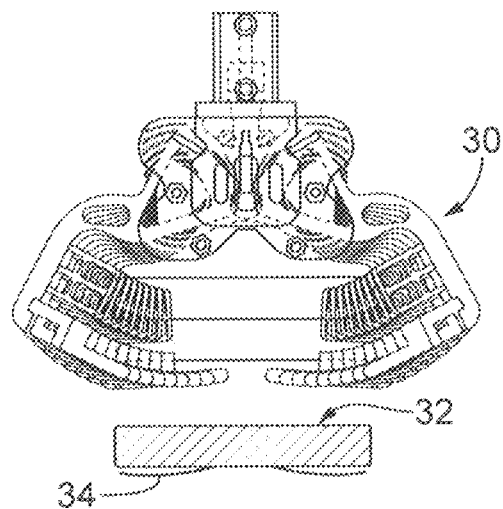
FIG. 2a shows a front view of a gripper of the present invention with a formed food patty.

FIG. 2a shows the gripper 30 and the formed raw patty 32. The gripper 30 creates a finger part 34 under the patty 32 that creates no interference when lifting the patty 32.

Figure 2B:
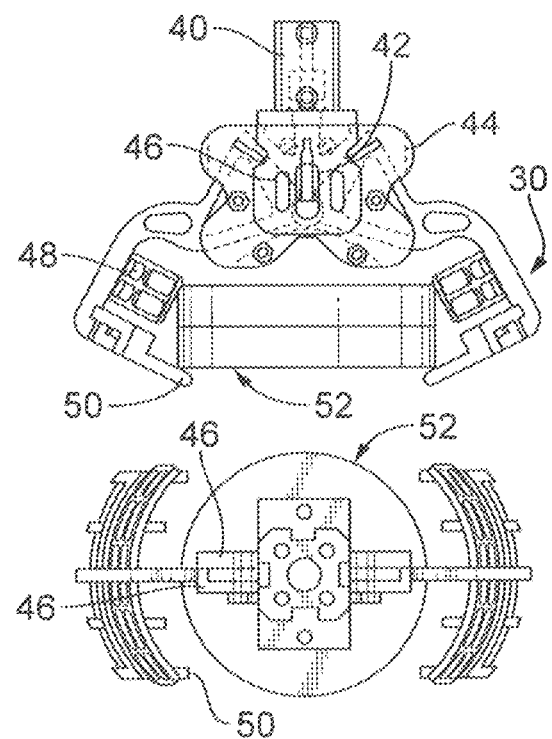
FIG. 2b shows a front view of a gripper of the present invention.

FIG. 2b shows the gripper 30 having a single actuation 40, two angle adapters 42 and two motion spacers 44. Gripper 30 further has guided pins and hybrid slots 46 for straight and complex curves. Cage 48 keeps patties from moving while gripped. The cage 48 is made from aluminum machined parts. The gripper 30 can be manufactured or 3D printed. FIG. 2b further comprise fingers 50 for going under the formed raw patty 52. FIG. 2b further shows the gripper 30 and the motion spacers 46.

Figure 3A:
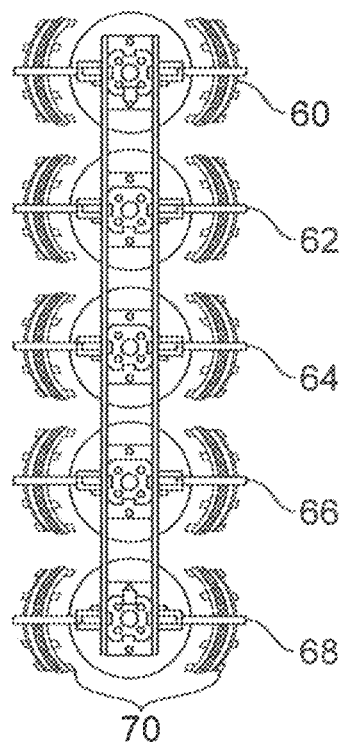
FIG. 3a shows a top view of a two patty five stack gripper of the present invention.
Figure 3B:
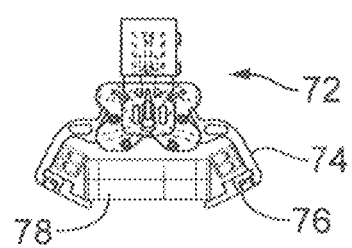
FIG. 3b shows a front view of a two patty five stack gripper of the present invention.

FIG. 3a shows a top view of a set of five grippers 60, 62, 64, 66, and 68. Each gripper has a cage 70. FIG. 3b shows a front view of gripper 72 having cage 74 and finger 76 holding 2 raw patties 78.

Figure 3C:
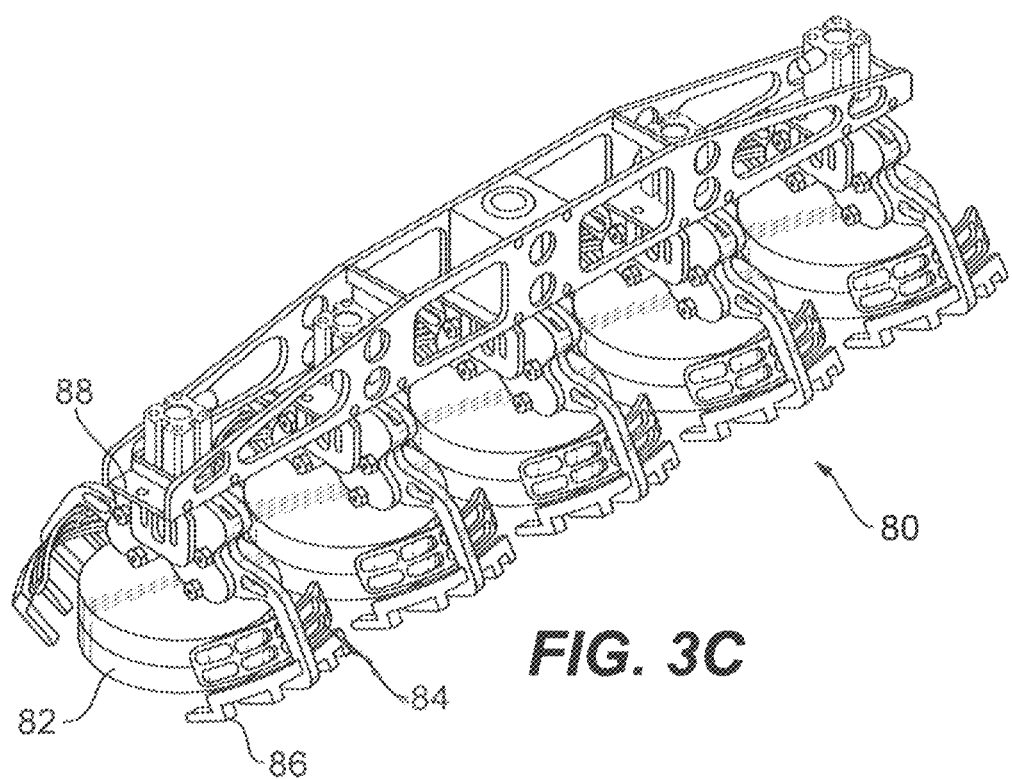
FIG. 3c shows a top side view of a two patty five stack gripper of the present invention.
Figure 3D:
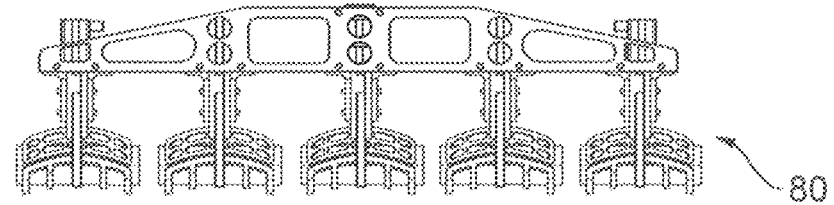
FIG. 3d shows a side view of a two patty five stack gripper of the present invention.

FIG. 3c shows a side view of the two patty five stack gripper device 80, each gripper device having a cage 84, finger 86 and adaptor 88. The gripper holding two raw formed patties 82. FIG. 3d is a side view of the gripper device 80.

FIG. 4 shows a side view of the two patty five stack gripper device 90 over a conveyor belt 92, each gripper 94 having two patties 96.

FIG. 5 shows a side view of the two patty five stack gripper device 90 over a conveyor belt 92, each gripper 94 having two patties 96.

Figure 6:
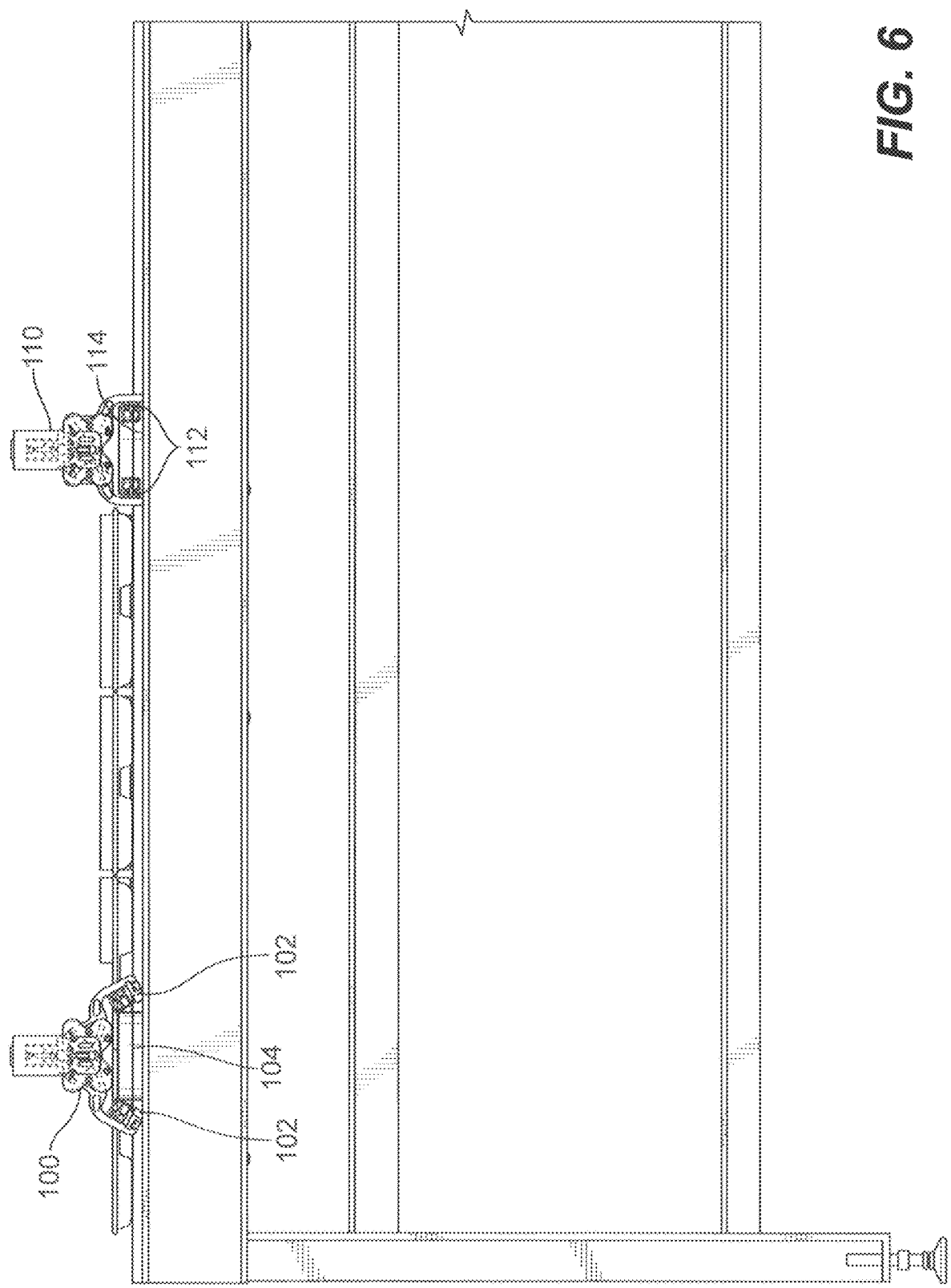
FIG. 6 shows a side view of the grippers gripping and transferring the patties.

FIG. 6 shows a side view of an individual gripper 100 in the open position 102 surrounding a stack of patties 104, and then further along the conveyor belt, an individual gripper 110, in the closed position 112 having the patties 114 within the gripper 110.

Figure 7:
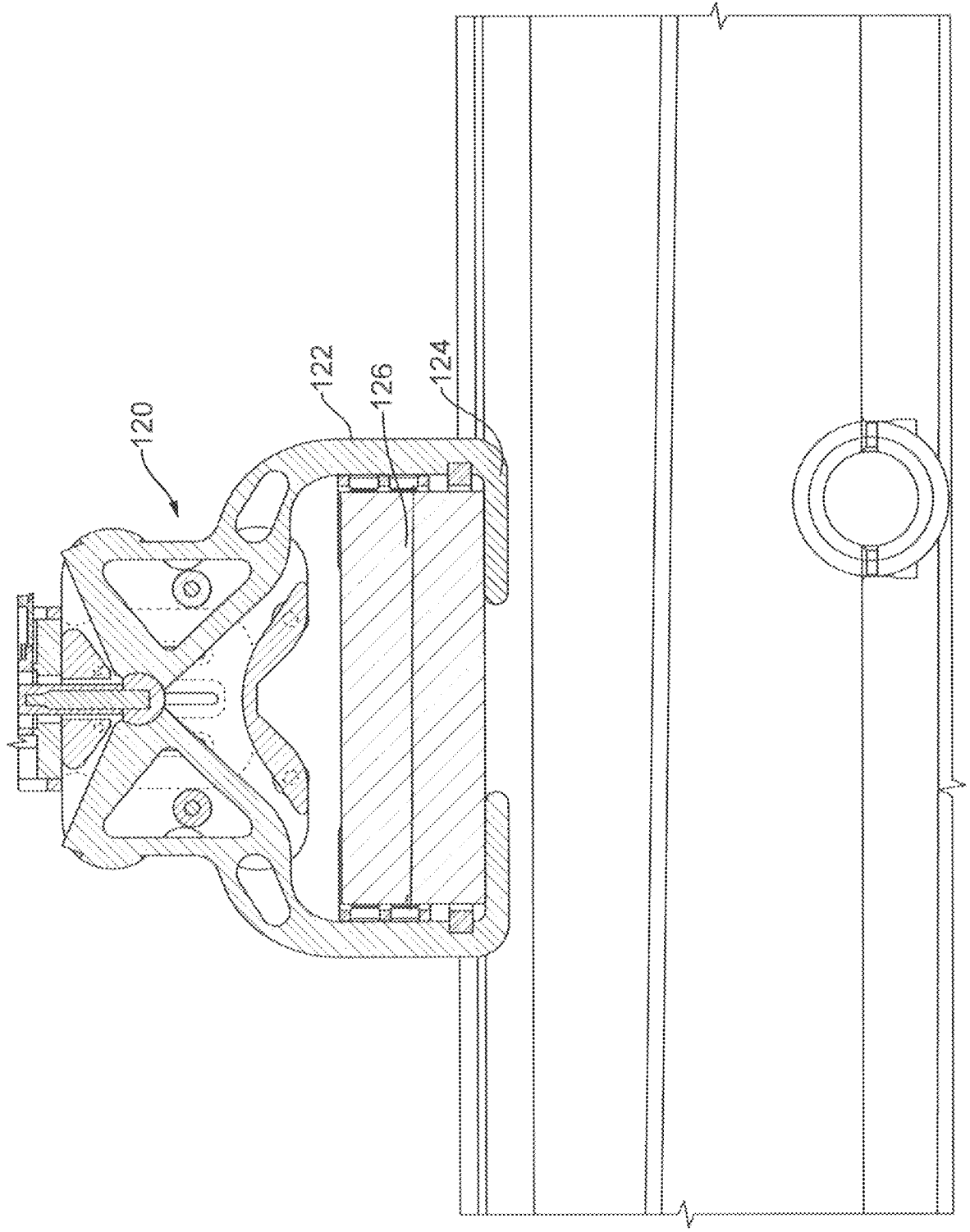
FIG. 7 shows a side view of a gripper gripping multiple patties.

FIG. 7 shows a front view of an individual gripper 120 in the closed position surrounding a stack of patties 126 surrounded by a cage 122 having fingers 124 underneath the patties 126.

Figure 8:
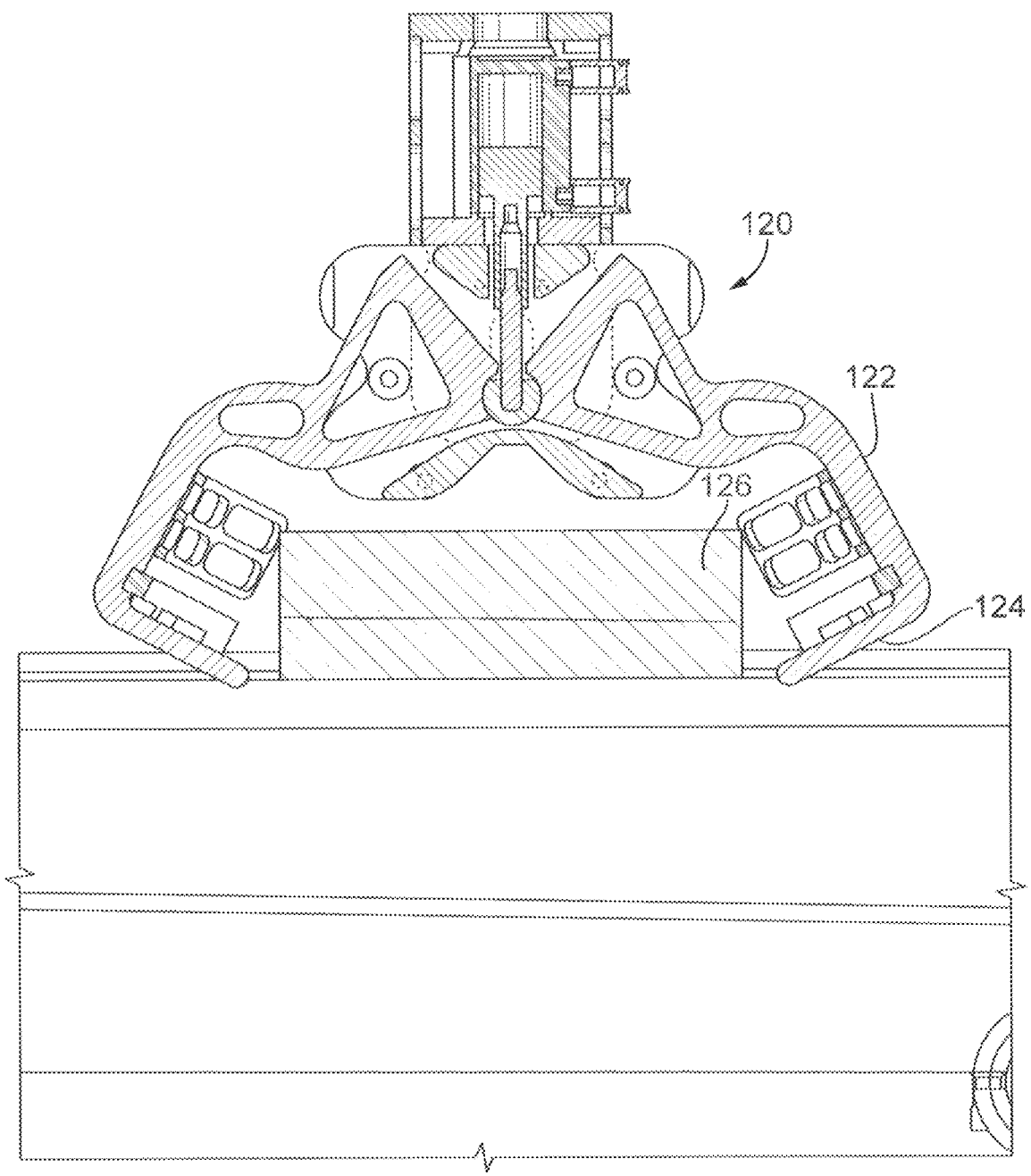
FIG. 8 shows a front view of a gripper that is about to grip multiple patties.

FIG. 8 shows a front view of an individual gripper 120 in the open position about to grasp a stack of patties 126. The gripper 120 has a cage 122 and fingers 124.

Figure 9:
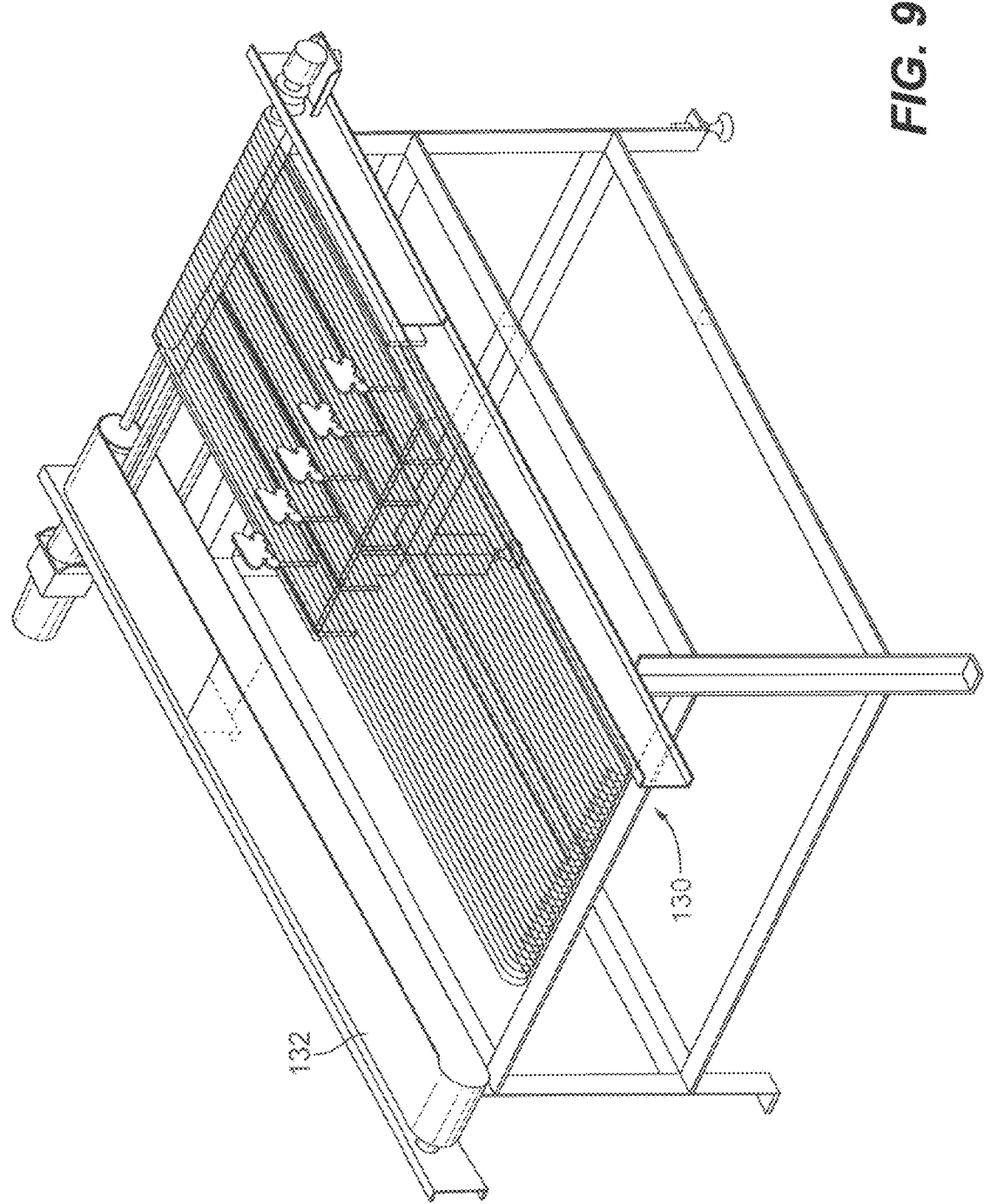
FIG. 9 shows a top view of the conveyor of the present invention.

FIG. 9 is a top view of the conveyor 130 and the tray device 132.

Figure 10:
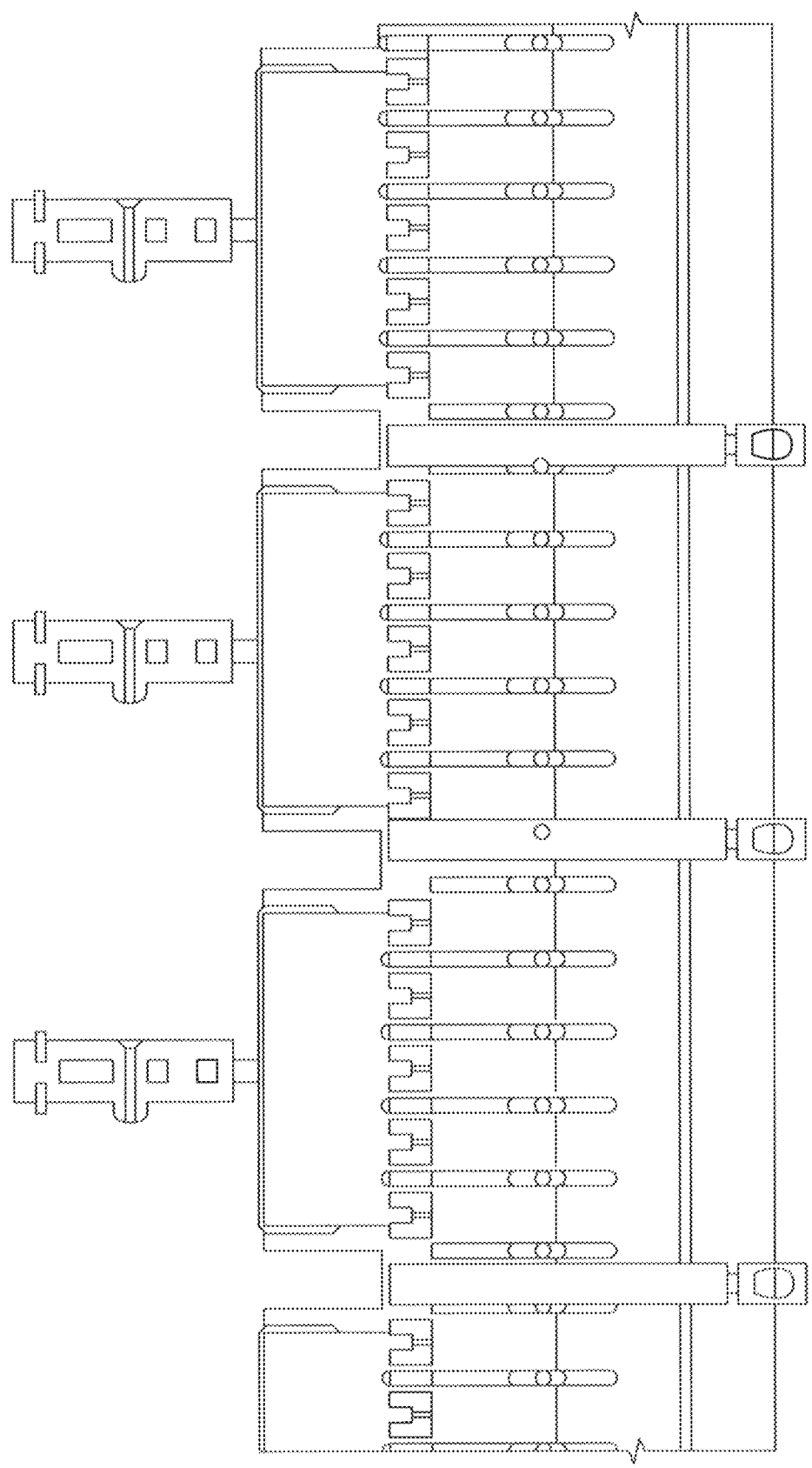
FIG. 10 shows a front view of the device of the present invention.

FIG. 10 is a front expanded view of FIG. 5.

Figure 11:
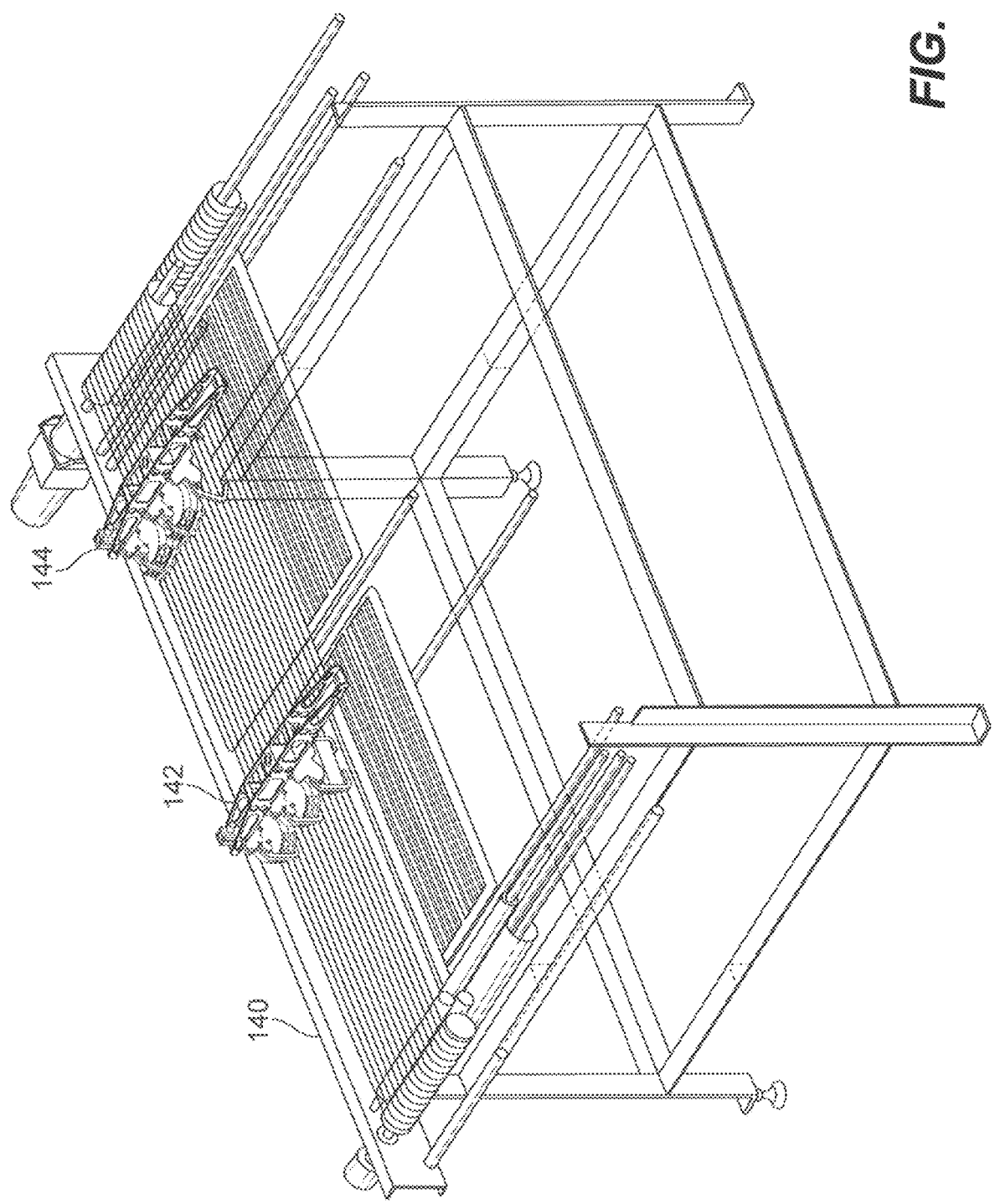
FIG. 11 shows a top view of the gripper and conveyor device of the present invention.

FIG. 11 is a top side view of a conveyor 140 having two sets of gripper devices 142 and 144.

Figure 12:
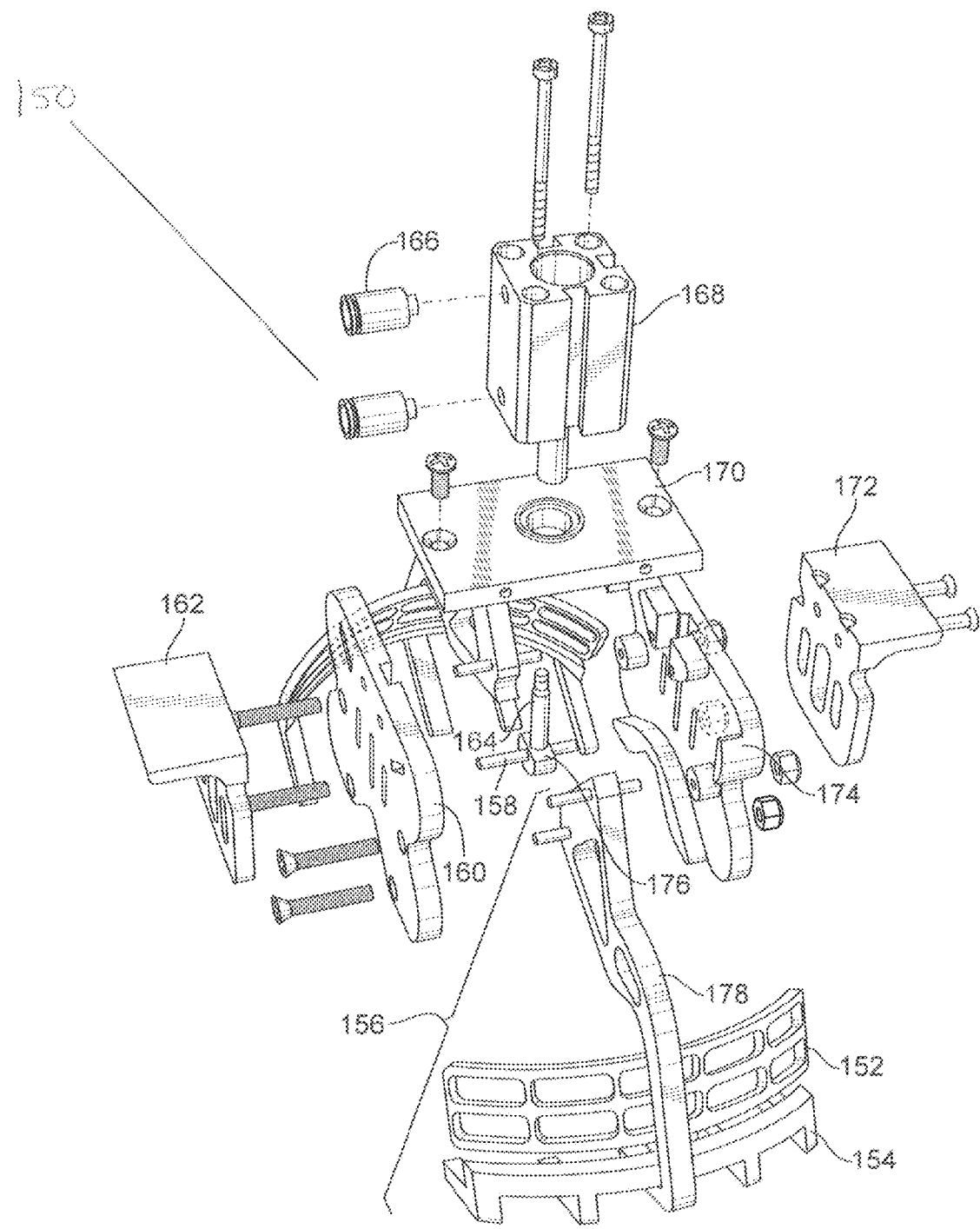
FIG. 12 is a top unassembled view of the gripper of the present invention.

FIG. 12 is an unassembled top view of a gripper device 150. The motion of the gripper device 150 is a complex curve. The gripper device 150 is made of two finger assemblies 156. The finger assembly 156 is made up of a cage 152, patty grip fingers 154, and a patty grip arm 178. Also included in the gripper device 150 is two motion spacers 160 and 174. Also included are two angle adapters 162 and 172. A coupling bearing 176 is attached to an actuator pin 158, pneumatic rod connect 164 that connects the connector actuator to the coupling bearing 176. Coupling bearing 176 changes the motion from up and down to opening and closing of the gripper 150. The gripper 150 further comprises air fittings 166. The gripper 150 is further comprised of a pneumatic actuator 168 and pneumatic actuator adapter 170. Compressed air makes the piston move down, while released air makes the piston move up.

Figure 13:
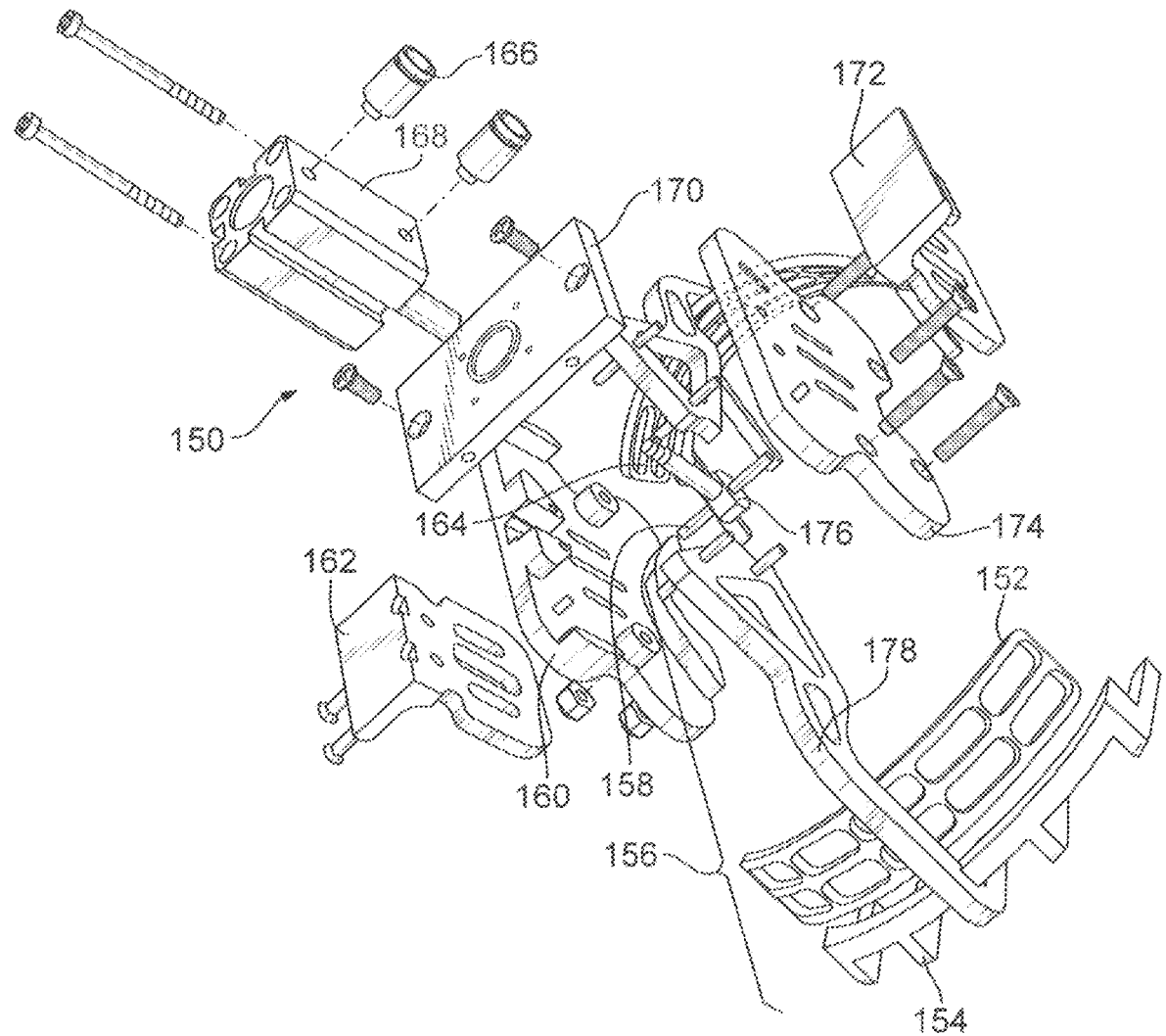
FIG. 13 is a side unassembled view of the gripper of the present invention.

FIG. 13 is an unassembled side view of gripper device 150. The gripper device 150 is made of two finger assemblies 156. The finger assembly 156 is made up of a cage 152, patty grip fingers 154, and a patty grip arm 178. Also included in the gripper device 150 is two motion spacers 160 and 174. Also included are two angle adapters 162 and 172. A coupling bearing 176 is attached to an actuator pin 158, pneumatic rod connect 164 that connects the connector actuator to the coupling bearing 176. Coupling bearing 176 changes the motion from up and down to opening and closing of the gripper 150. The gripper 150 further comprises air fittings 166. The gripper 150 is further comprised of a pneumatic actuator 168 and pneumatic actuator adapter 170. Compressed air makes the piston move down, while released air makes the piston move up.

Figure 14:
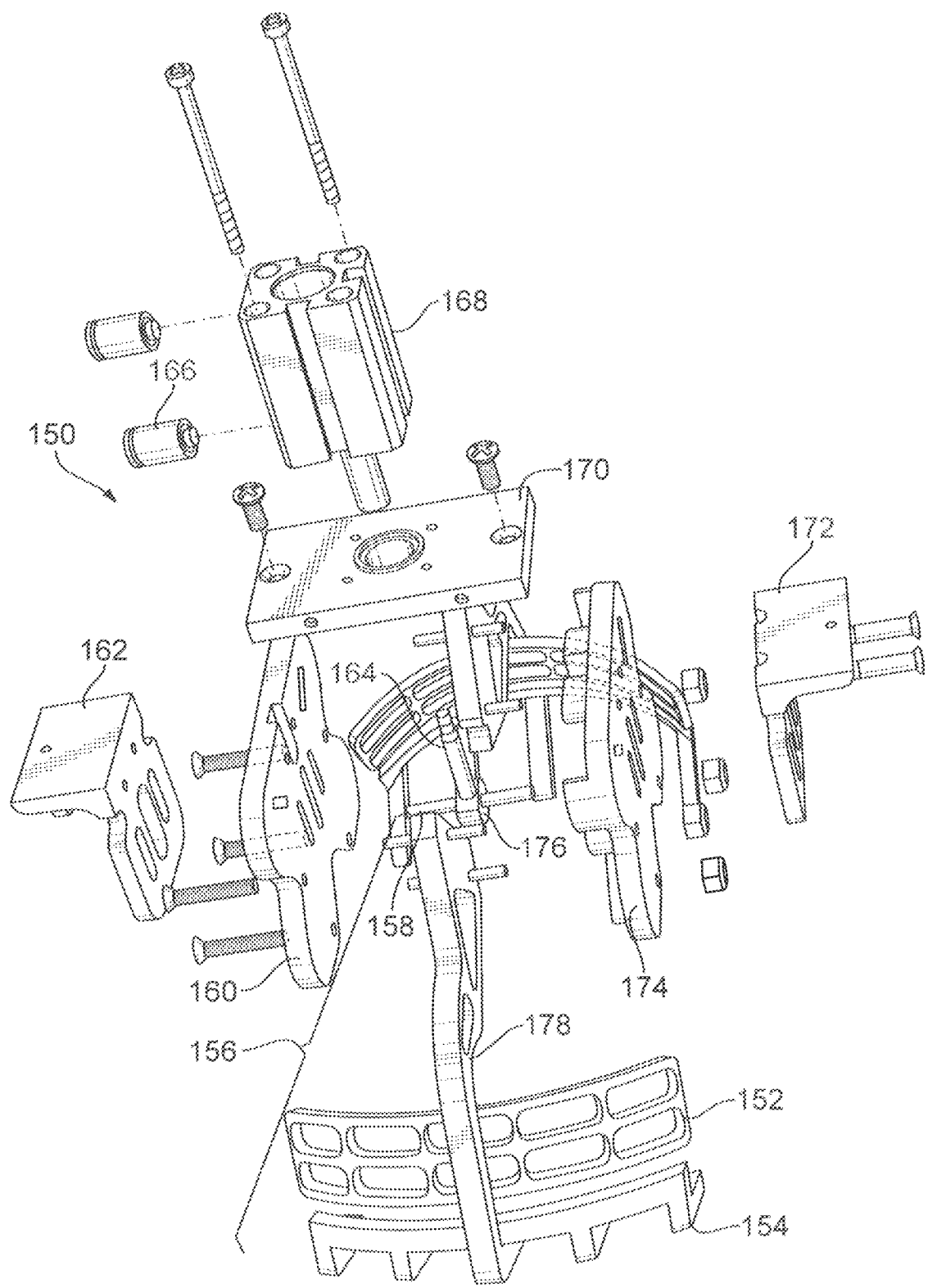
FIG. 14 is a side unassembled view of the gripper of the present invention.

FIG. 14 is an unassembled side view of a gripper device 150. The gripper device 150 is made of two finger assemblies 156. The finger assembly 156 is made up of a cage 152, patty grip fingers 154, and a patty grip arm 178. Also included in the gripper device 150 is two motion spacers 160 and 174. Also included are two angle adapters 162 and 172. A coupling bearing 176 is attached to an actuator pin 158, pneumatic rod connect 164 that connects the connector actuator to the coupling bearing 176. Coupling bearing 176 changes the motion from up and down to opening and closing of the gripper 150. The gripper 150 further comprises air fittings 166. The gripper 150 is further comprised of a pneumatic actuator 168 and pneumatic actuator adapter 170. Compressed air makes the piston move down, while released air makes the piston move up.

Figure 15:
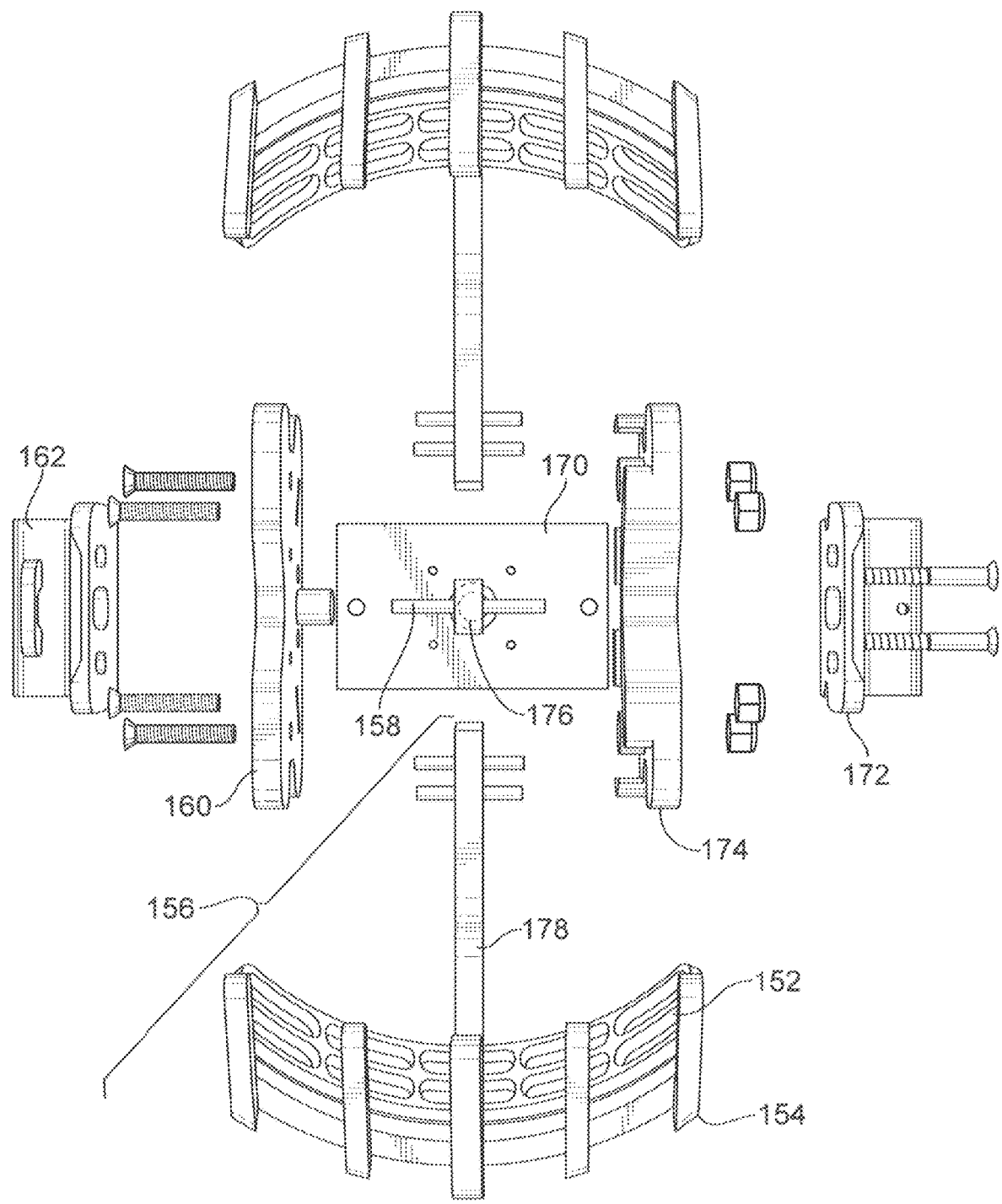
FIG. 15 is a bottom unassembled view of the gripper of the present invention.

FIG. 15 is a bottom unassembled view of a gripper device 150. The gripper device 150 is made of two finger assemblies 156. The finger assembly 156 is made up of a cage 152, patty grip fingers 154, and a patty grip arm 178. Also included in the gripper device 150 is two motion spacers 160 and 174. Also included are two angle adapters 162 and 172. A coupling bearing 176 is attached to an actuator pin 158, pneumatic rod connect 164 (not shown) that connects the connector actuator to the coupling bearing 176. Coupling bearing 176 changes the motion from up and down to opening and closing of the gripper 150. The gripper 150 is further comprised of a pneumatic actuator 168 (not shown) and pneumatic actuator adapter 170. Compressed air makes the piston move down, while released air makes the piston move up.

Figure 16A:
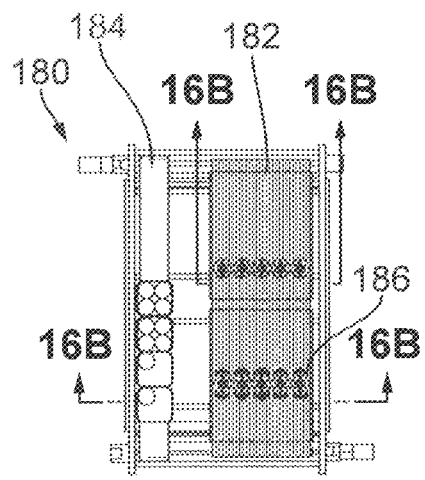
FIG. 16a is a bottom view of the gripper and conveyor assembly of the present invention.

FIG. 16a shows a bottom view of the robotic gripper/conveyor/tray device 180. The device is comprised of conveyor 182, trays 184 and grippers 186.

Figure 16B:
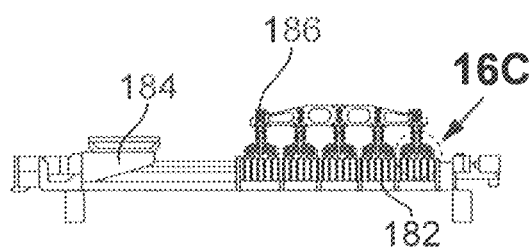
FIG. 16b is a side view of the gripper and conveyor assembly through section A-A of FIG. 16a of the present invention.

FIG. 16b is a view of section A-A of FIG. 16a showing a front view of the grippers 186 above the conveyor 182, and the trays 184.

Figure 16C:
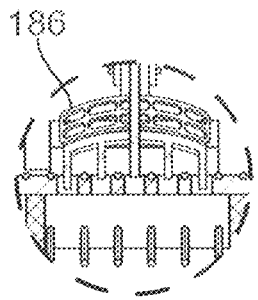
FIG. 16c is a view through section A in FIG. 16b.

FIG. 16c is a detailed view of section A of FIG. 16b showing one of the grippers 186.

Figure 16D:
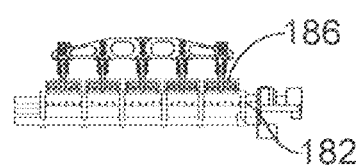
FIG. 16d is a view through section B-B of FIG. 16a of the present invention.

FIG. 16d is a view of section B-B of FIG. 16a showing a front view of the grippers 186 on the conveyor 182.

Figure 16E:
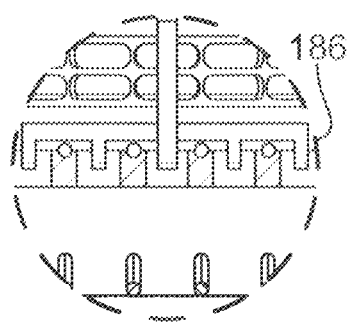
FIG. 16e is a view through section B in FIG. 16d.

FIG. 16e shows a detailed view of section B of FIG. 16d. A detailed view of gripper 186 is shown.

Figure 16F:
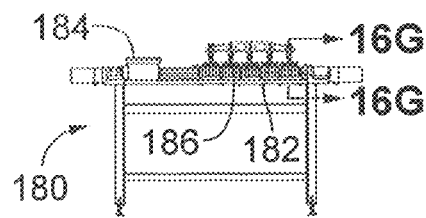
FIG. 16f is a front view of the gripper and conveyor assembly of the present invention.

FIG. 16f shows a front view of the device 180. The device is comprised of conveyor 182, trays 184 and grippers 186.

Figure 16G:
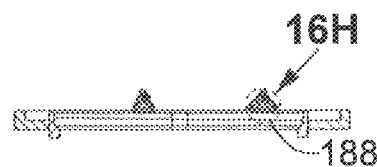
FIG. 16g is a is a view through section C-C of FIG. 16f of the present invention.

FIG. 16g is a view of section C-C of FIG. 16f showing a side view of the gripper 186.

Figure 16H:
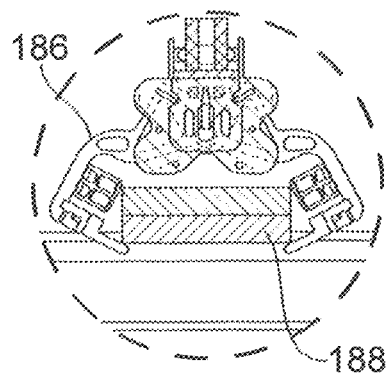
FIG. 16h is a view through section C in FIG. 16h.

FIG. 16h is a detail view of section C of FIG. 16g. The figure shows the gripper 186 in the open position around raw patties 188.

Figure 17:
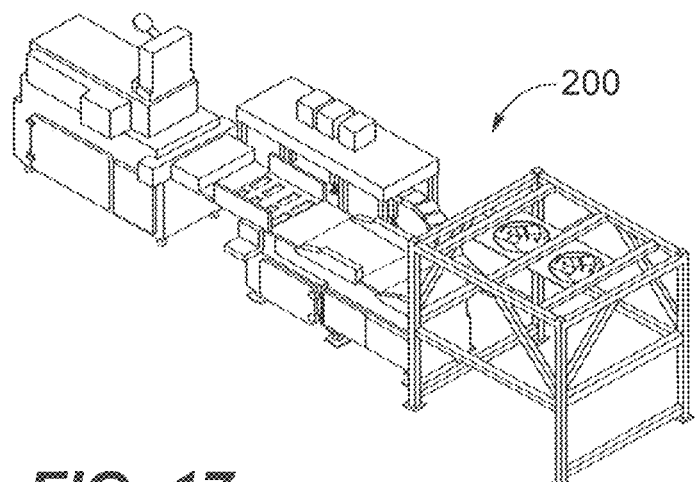
FIG. 17 is a top side view of a patty tray filling device.

FIG. 17 shows a top side view of the complete patty tray filling system 200, from the making of the patties to placing the formed patties onto a tray.

Figure 18:
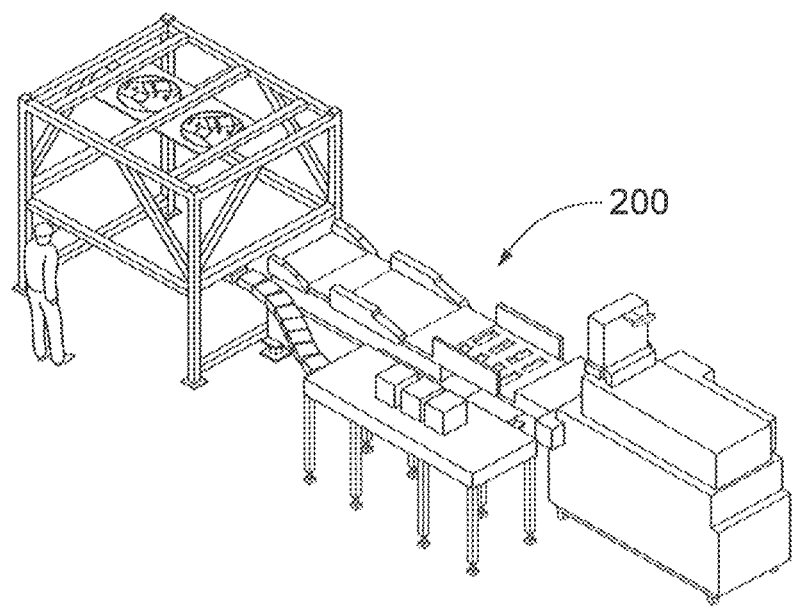
FIG. 18 is a top side view of a patty tray filling device.

FIG. 18 shows a top side view of the complete patty tray filling system 200, from the making of the patties to placing the formed patties onto a tray.

Figure 19:
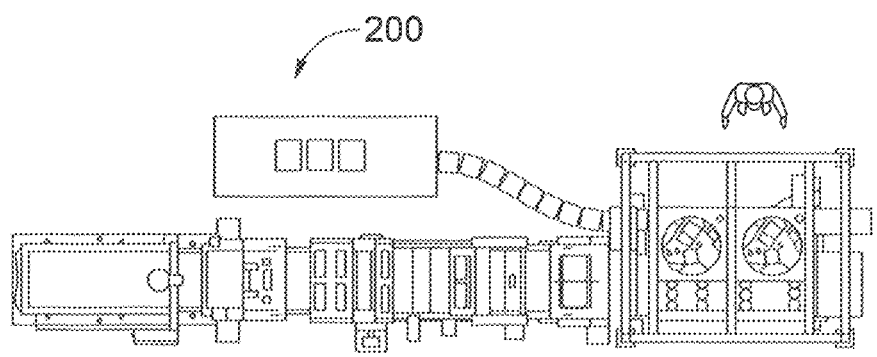
FIG. 19 is a top view of a patty tray filling device.

FIG. 19 shows a top view of the complete patty tray filing system 200, from the making of the patties to placing the formed patties onto a tray.

Figure 20:
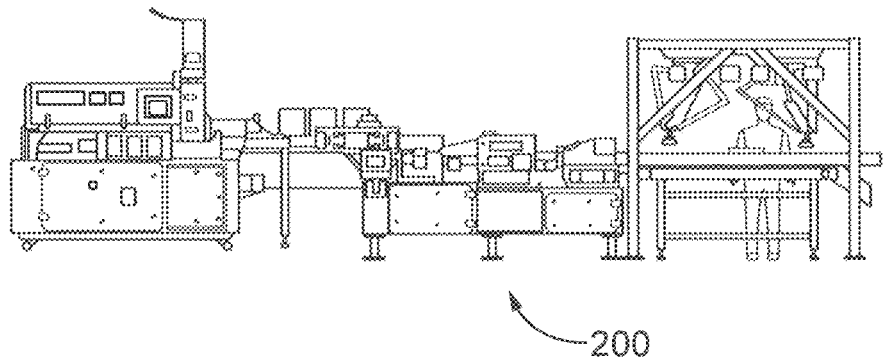
FIG. 20 is a side view of a patty tray filing device.

FIG. 20 shows a side view of the complete patty tray filling system 200, from the making of the patties to placing the formed patties onto a tray.

Figure 21:
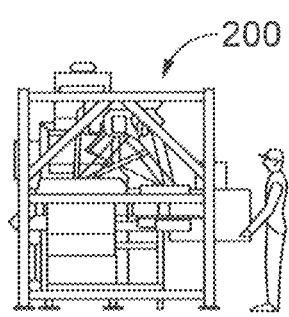
FIG. 21 is an end view of a patty tray filling device.

FIG. 21 shows an end view of the complete patty tray filling system 200, from making of the patties to placing the formed patties onto a tray.

Figure 22:
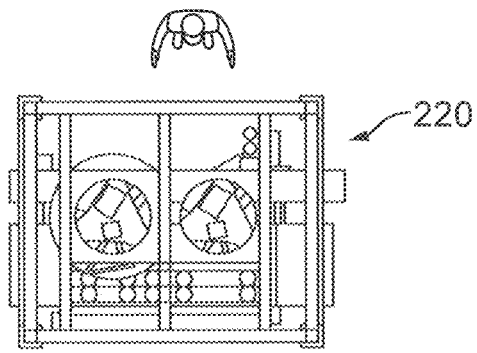
FIG. 22 is a top view of the gripper device as part of the patty tray filling device.

FIG. 22 shows a top view of the robotic gripper/conveyor/tray device 220.

Figure 23:
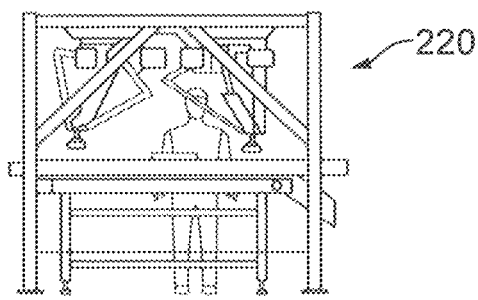
FIG. 23 is a side view of the gripper device as part of the patty tray filling device.

FIG. 23 shows a side view of the robotic gripper/conveyor/tray device 220.

Figure 24:
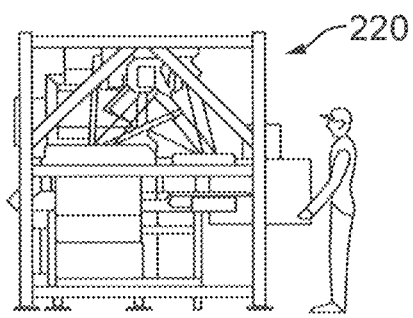
FIG. 24 is an end view of the gripper device as part of the patty tray filling device.

FIG. 24 shows a front view of the robotic gripper/conveyor/tray device 220.

Figure 25:
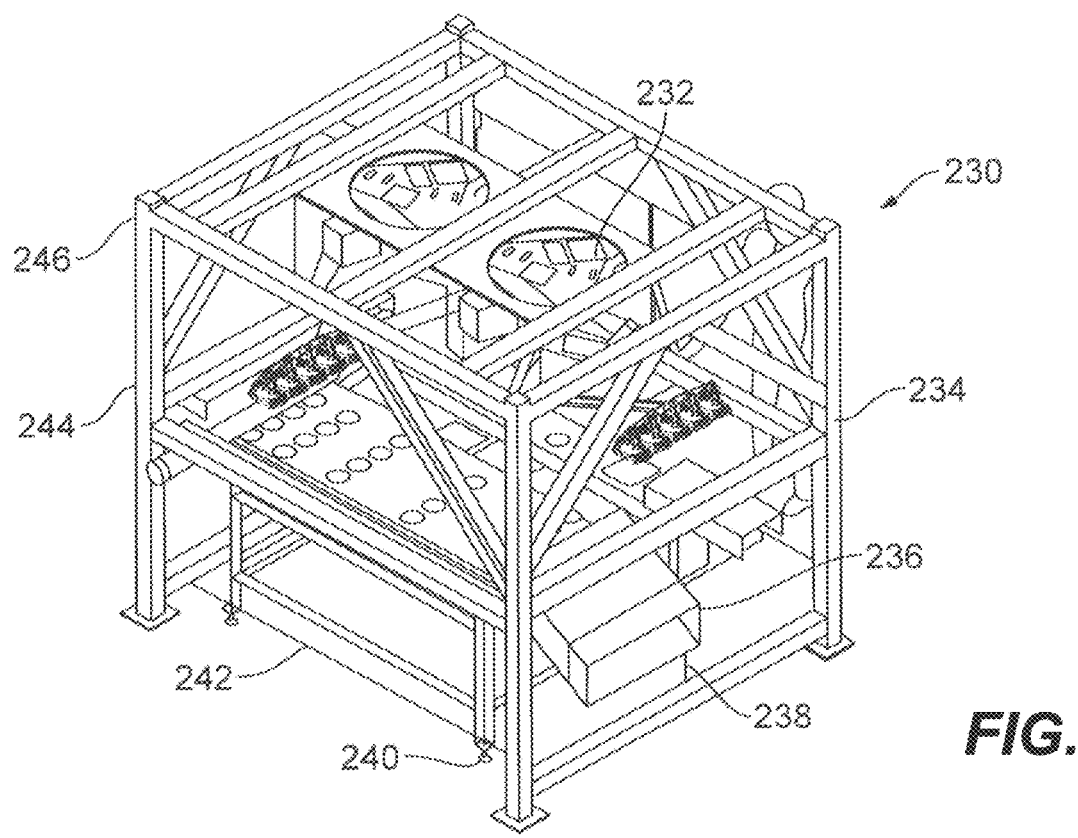
FIG. 25 is a top side view of the gripper device as part of the patty tray filling device.

FIG. 25 shows a top view of the robotic gripper/conveyor/tray device 230. The device 230 shows the robotic gripping devices 232, which are rated for hygienic processing plants. The device further comprises removable upper end guards 234, removable transition covers 236 and removable lower end guards 238. The device comprises a conveyor 240 removed from the end or sides, removed skirt guards 242, removable upper guards 246 and hinged doors 244.

Figure 26:
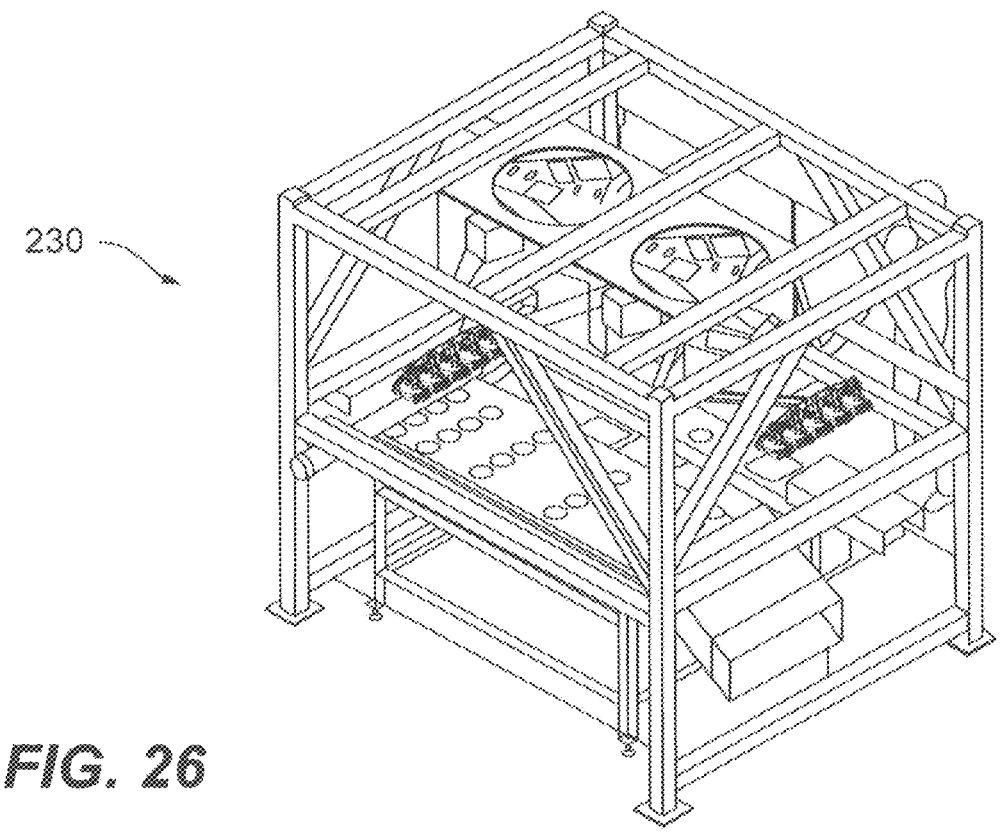
FIG. 26 is a top side view of the gripper device as part of the patty tray filling device.

FIG. 26 shows a top side view of the robotic gripper/conveyor/tray device 230.

Figure 27:
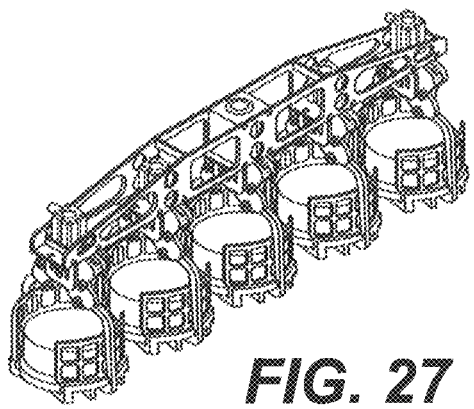
FIG. 27 is a top side view of a 5 patty end of arm tooling.

FIG. 27 shows a side view of the five patty end of arm tooling 250, that is capable of loading 400 patties per minute.

Figure 28:
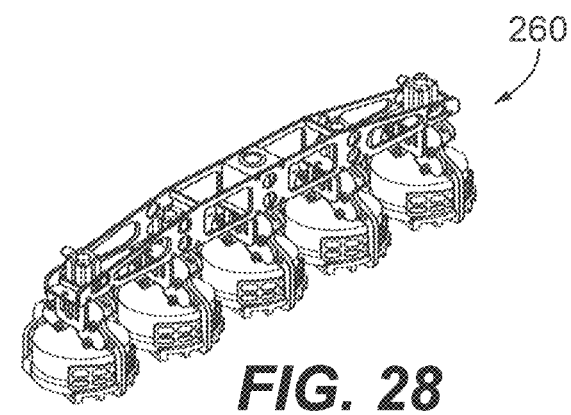
FIG. 28 is a top side view of a 2 patty end of arm tooling.

FIG. 28 shows a side view of the two patty end of arm tooling 260 that is capable of loading 275-300 patties per minute.

Figure 29:
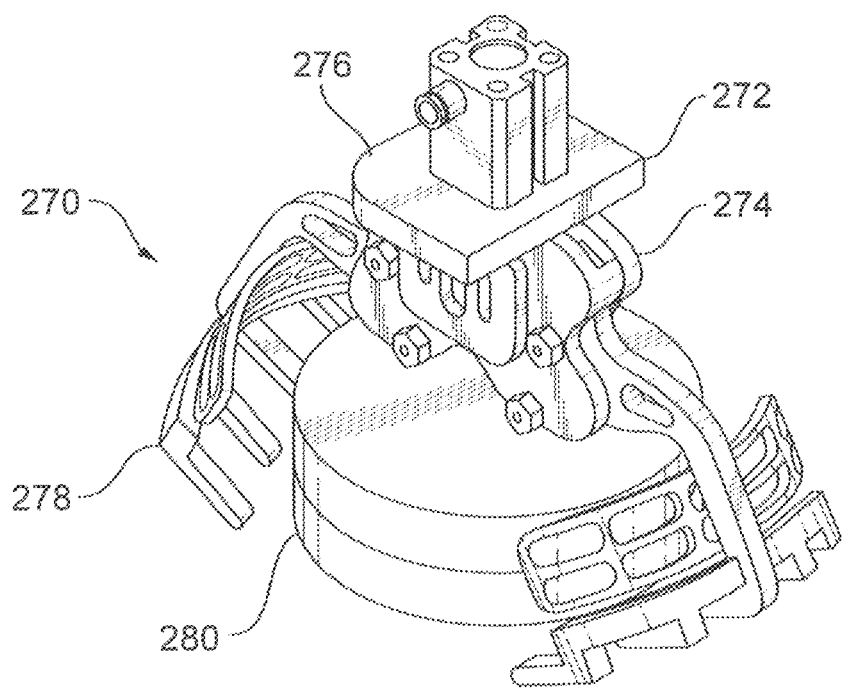
FIG. 29 is a top side view of a gripper of the present invention.

FIG. 29 shows a top view of the gripper 270 showing an adapter 272, a motion spacer 274 and a motion plate 276. The gripper 270 further comprises a two stack finger weldment 278, a pin actuator 280 and a pin hold 282. The gripper 270 has no metal to metal contact for moving parts. The parts are machined aluminum components that are anodized. Only food grade lubricants are used. The design of gripper 270 allows for the picking and placing of individual raw formed product and stacks of raw formed product. The complete system of multiple grippers combined is termed an "End of Arm Tool". The End of Arm Tool is used to pick and place individual product in an array(s) of single patties or arrays of stacks of patties or product. Each individual gripper in the End of Arm Tool can be independently actuated allowing the product to be picked or placed from and to multiple locations, not as a group, but could be used in unison if advantageous. This independence allows the placement of single or multiple product into multiple locations or packaging.

Figure 30:
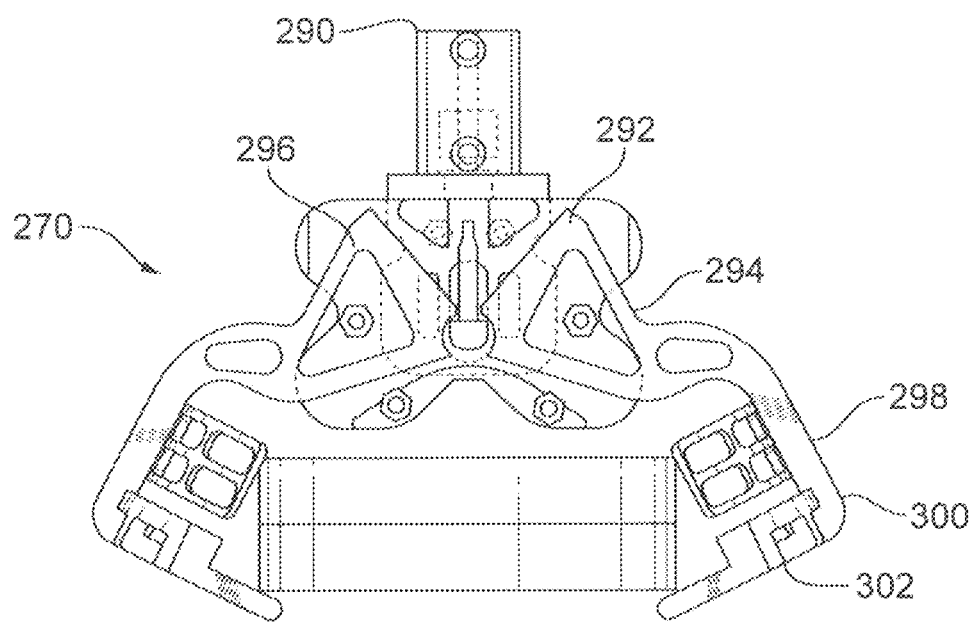
FIG. 30 is a top view of a gripper with side supports and front guide plate removed.

FIG. 30 shows the gripper 270 with side supports and front guide plate removed. The gripper 270 comprises a pneumatic actuator 290, SS pins 292 that press fit into gripper arms. The gripper 270 comprises a coupling bearing 294 and a rod connect 296. The gripper 270 comprises a gripper arm 298, a cage 300 and fingers 302.

Figure 31:
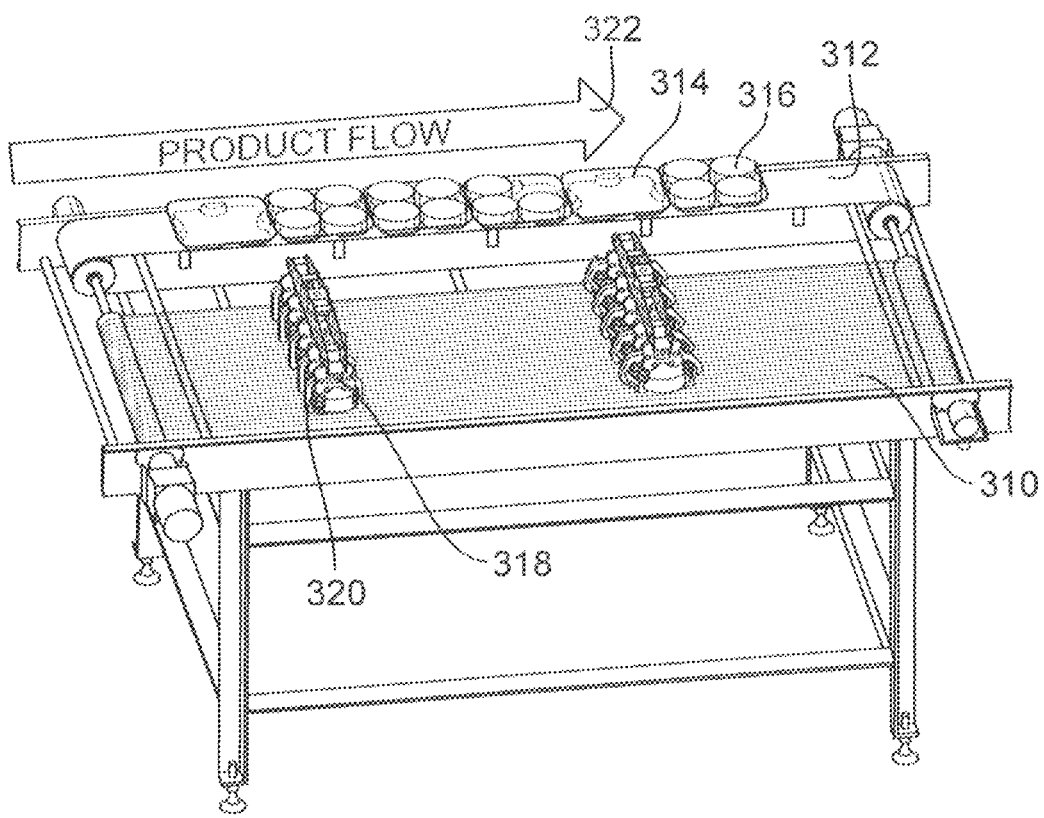
FIG. 31 is a top side view showing the product flow of the patties on the conveyor and the grippers.

FIG. 31 shows the conveyor 310 and the tray moving device 312 having trays 314 and formed patties 316. Arms 318 having grippers 320 are located over the conveyor 310. Arrow 322 shows the direction of flow of the product. Robots with End of arm tools are picking 5 stacks of food from the patty conveyor. The End of Arm Tool, with up to 12 grippers, picks the stacks once for each cycle. The stacks are then placed one or two per drop until all the grippers are empty before returning to the Patty conveyor to pick another array of stacks. Trays 314 can be any size and shape as long as they have two locatable edges for guidance.

Figure 32:
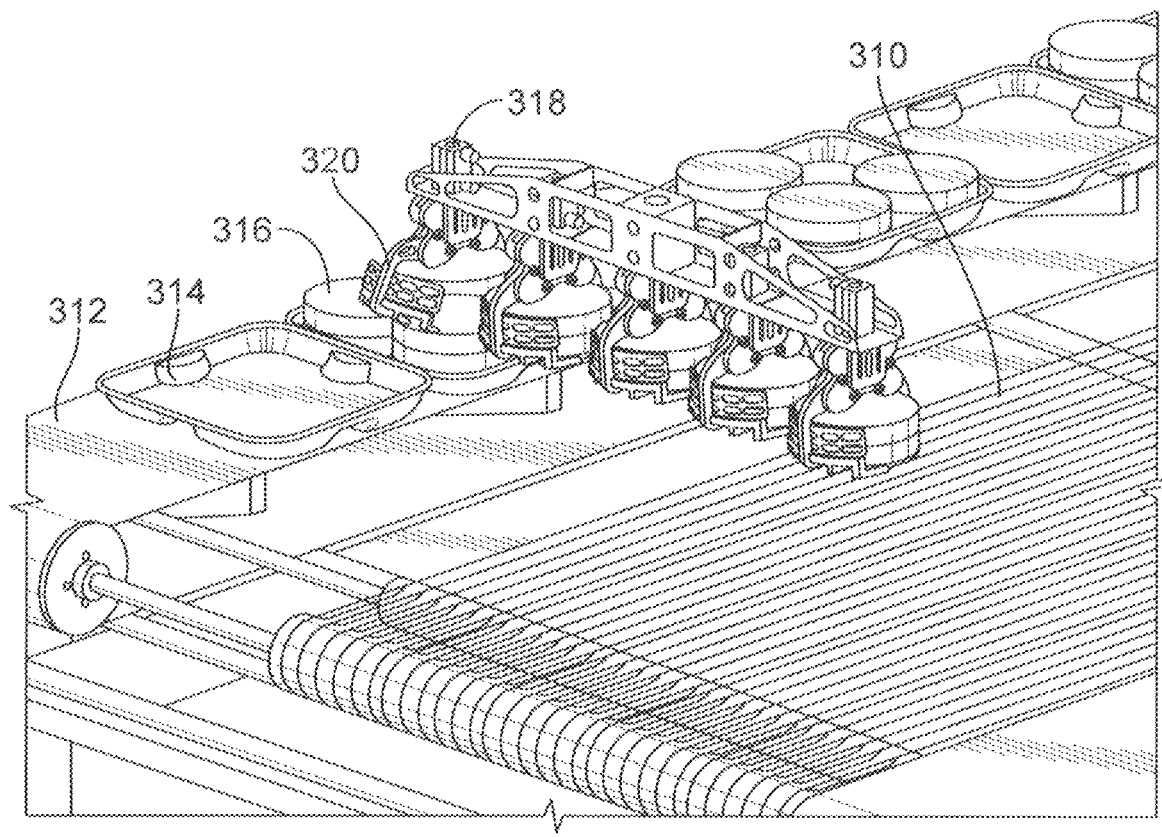
FIG. 32 is a top side view of the first stack of patties being dropped into the tray by the grippers.

FIG. 32 shows the conveyor 310 and the tray moving device 312 having trays 314 and formed patties 316. Arms 318 having grippers 320 are located over the conveyor 310. The figure shows that the Tool can drop individual stacks in prescribed packaging tray locations. Since the spacing of the stacks on the patty conveyor are not always equal to the location spacing in the tray, the tools can independently drop stacks in multiple locations while the trays are moving. The programmed control system tracks the tray's position on the tray conveyor.

Figure 33:
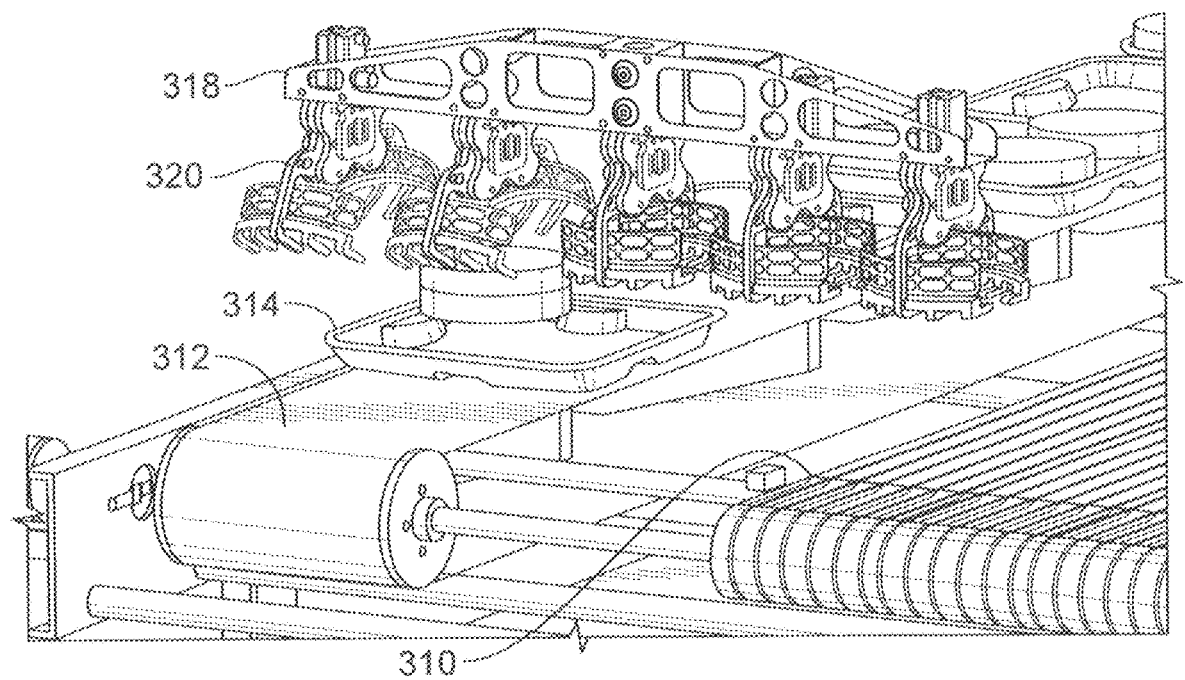
FIG. 33 is a rear view showing a second stack of patties being dropped into a tray by the grippers.

FIG. 33 shows a front view of the conveyor 310 and the tray moving device 312 having trays 314. Arms 318 having grippers 320 are located over the trays 314. The figure shows a second stack of formed raw patties being dropped into a tray 314.

Figure 34:
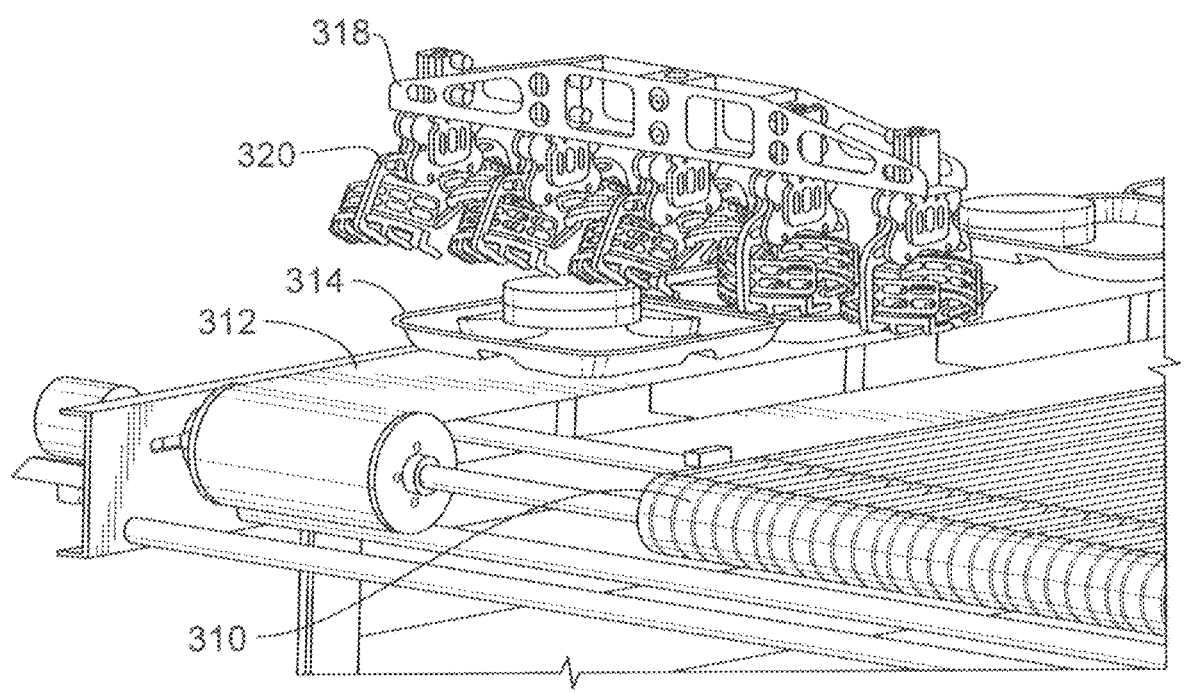
FIG. 34 is a rear view showing a third stack of patties being dropped into a tray by the grippers.

FIG. 34 shows a front view of the conveyor 310 and the tray moving device 312 having trays 314. Arms 318 having grippers 320 are located over the trays 314. The figure shows a third stack of formed raw patties being dropped into a tray 314.

Figure 35:
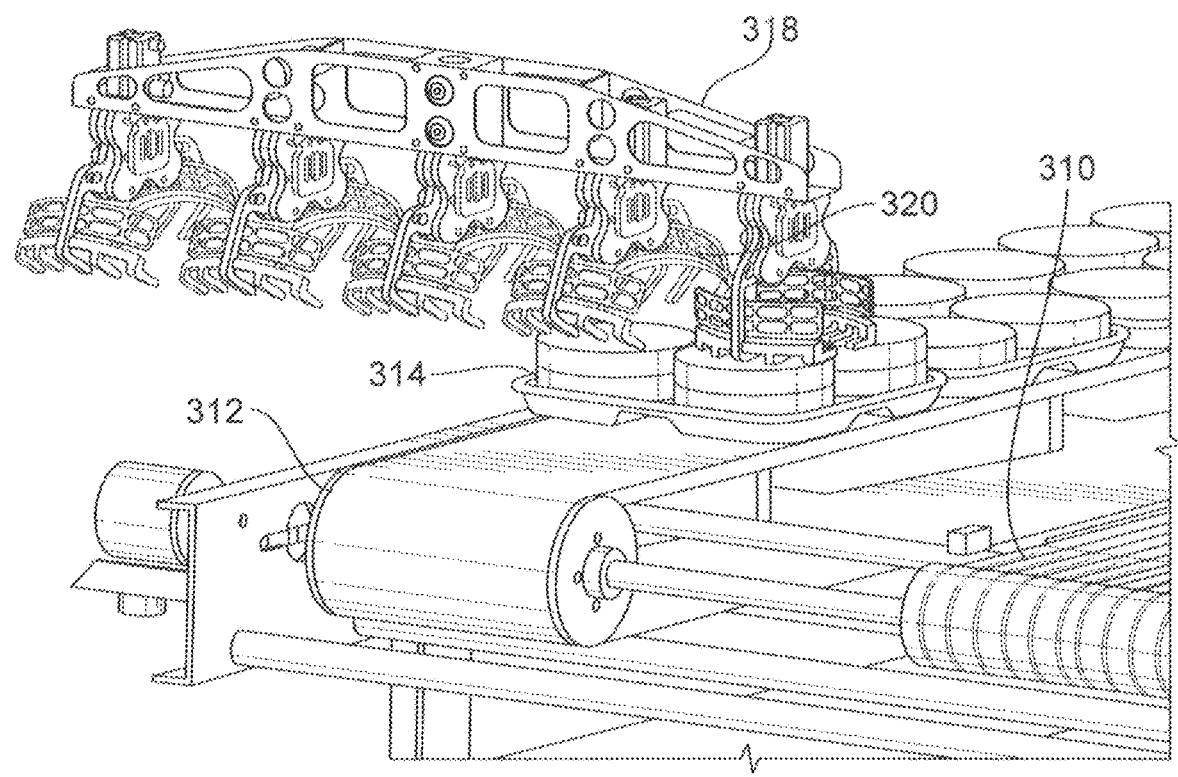
FIG. 35 is a rear view showing a fourth stack of patties being dropped into a tray by the grippers.

FIG. 35 shows a front view of the conveyor 310 and the tray moving device 312 having trays 314. Arms 318 having grippers 320 are located over the trays 314. The figure shows a fourth stack of formed raw patties being dropped into a tray 314.

Figure 36:
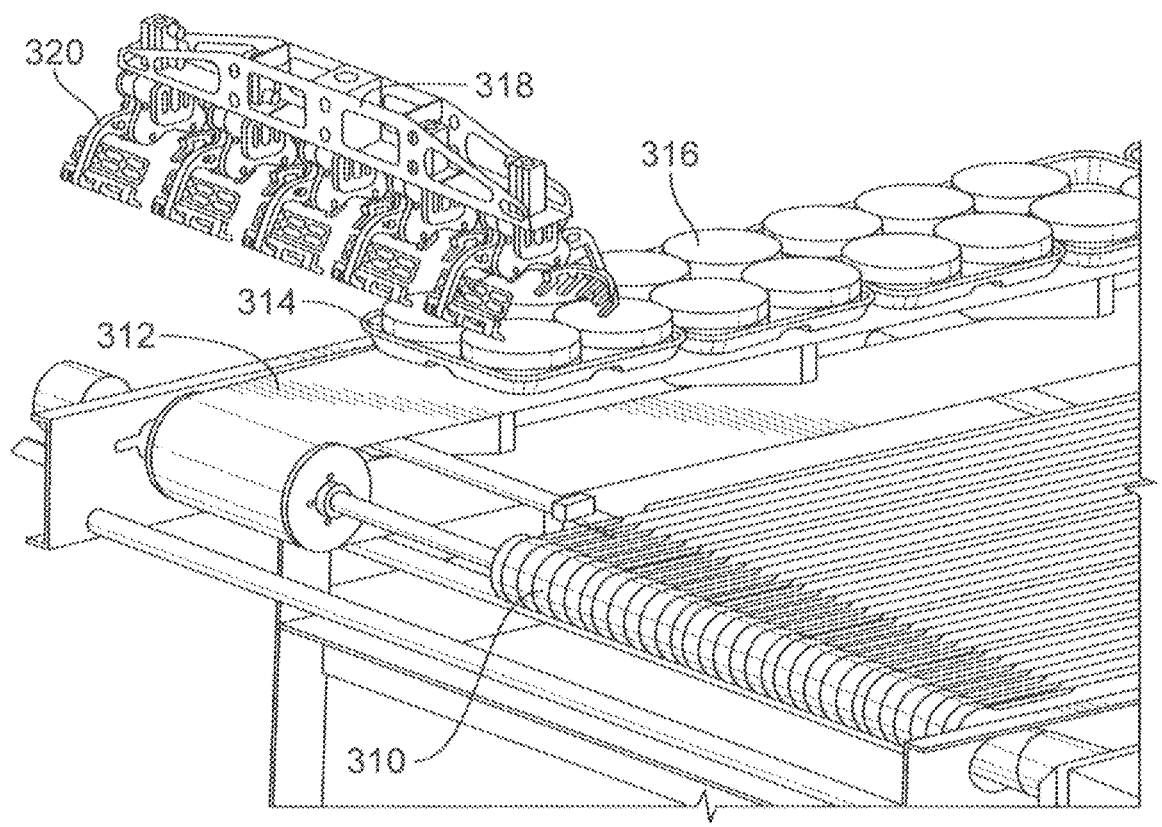
FIG. 36 is a side view showing a fifth stack of patties being dropped into a tray by the grippers.

FIG. 36 shows a front view of the conveyor 310 and the tray moving device 312 having trays 314 and formed raw patties 316. Above the trays 314 is the arm 318 having grippers 320. FIG. 36 shows the fifth stack being dropped into a tray 314. After the final stack is dropped into the tray 314, the gripper robot returns to the patty conveyor 310 and picks another array of stacks. Both robot grippers work in tandem with dependent algorithm allowing spaces in the trays to be filled by the second robot and end of arm tools.

The invention claimed is:

1. A device for moving food patties comprising:
   a gripper;
   said gripper comprised of fingers that are placed under a patty that create no interference;
   a single actuation;
   two angle adapters;
   two motion spacers;
   guided pins and hybrid slots that allow said gripper to move in straight and complex curves;
   a cage that keeps patties from moving while gripped.

2. A gripper device comprising:
   two finger assemblies;
   each finger assembly comprising a cage, patty grip fingers, and a patty grip arm;
   two motion spacers;
   two angle adapters;
   a part that changes motion from up and down to opening and closing of said gripper.

3. The gripper device of claim 2 wherein said part comprises a coupling bearing attached to an actuator pin and pneumatic rod connect that connect a connector actuator to said coupling bearing.

4. The gripper device of claim 2 further comprising air fittings.

5. The gripper device of claim 2 further comprising a pneumatic actuator and pneumatic actuator adapter.

6. The device of claim 2 wherein said device comprises removable upper and lower end guards and removable transition cover.

7. A gripper device comprising:
   an adapter;
   a motion spacer;
   motion plate;
   two stack finger weldment;
   pin actuator; and
   pin hold;
   said gripper having no metal to metal contact for moving parts;

each gripper being part of an end of arm tool that is independently actuated allowing product to be picked or place from and to multiple locations, not as a group.

8. The device of claim 7 wherein said grippers are used in unison.

9. The device of claim 7 wherein said gripper device allows placement of single or multiple product into multiple locations or packaging.

* * * * *